(12) United States Patent
Takeda et al.

(10) Patent No.: US 12,221,666 B2
(45) Date of Patent: Feb. 11, 2025

(54) STEEL SHEET AND METHOD FOR PRODUCING SAME

(71) Applicant: NIPPON STEEL CORPORATION, Tokyo (JP)

(72) Inventors: Kengo Takeda, Tokyo (JP); Yuya Suzuki, Tokyo (JP); Toyomitsu Nakamura, Tokyo (JP); Seiji Furusako, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 671 days.

(21) Appl. No.: 17/599,443

(22) PCT Filed: Nov. 15, 2019

(86) PCT No.: PCT/JP2019/044956
§ 371 (c)(1),
(2) Date: Sep. 28, 2021

(87) PCT Pub. No.: WO2020/225936
PCT Pub. Date: Nov. 12, 2020

(65) Prior Publication Data
US 2022/0177994 A1  Jun. 9, 2022

(30) Foreign Application Priority Data

May 9, 2019 (JP) .................... 2019-088962

(51) Int. Cl.
*C21D 9/46* (2006.01)
*B22D 11/11* (2006.01)
(Continued)

(52) U.S. Cl.
CPC .......... *C21D 9/46* (2013.01); *B22D 11/11* (2013.01); *B32B 15/013* (2013.01); *C21D 6/004* (2013.01);
(Continued)

(58) Field of Classification Search
CPC ...... C21D 9/46; C21D 1/19; C21D 2211/001; C21D 2211/002; C21D 2211/005;
(Continued)

(56) References Cited

U.S. PATENT DOCUMENTS

2010/0047107 A1* 2/2010 Yoshida ............... C21D 8/0226
420/104
2018/0371570 A1* 12/2018 Kim ..................... C21D 6/008
2020/0325554 A1  10/2020 Takeda et al.

FOREIGN PATENT DOCUMENTS

JP            9-24445 A      1/1997
JP            H09249937    *  9/1997
(Continued)

OTHER PUBLICATIONS

Song et al., "Study of the Heat Treatment of 316 Stainless Steel with Boron," Beijing BKDR Metallurgy Engineering & Technology Co., Ltd., Mar. 31, 2011, pp. 80-83, with English abstract.

*Primary Examiner* — Nicholas A Wang
(74) *Attorney, Agent, or Firm* — Birch, Stewart, Kolasch & Birch, LLP

(57) ABSTRACT

Provided is a steel sheet having a predetermined chemical composition and structure wherein (Fe, Mn)$_2$B precipitates having a circle equivalent diameter of 50 to 300 nm are present in a number density of 1/500 μm$^2$ or more in a surface layer region down to a depth of 100 μm from the surface in the sheet thickness direction. Further, provided is a method for producing a steel sheet comprising continuously casting a molten steel having a predetermined chemical composition to form a steel slab, wherein the continuously casting includes introducing more than 10 ppm and less than 100 ppm of oxygen into the surface layer of the steel slab, hot rolling including finish rolling the steel slab, wherein a completion temperature of the finish rolling is 650 to 950° C., coiling the obtained hot rolled steel sheet at a
(Continued)

coiling temperature of 400 to 700° C., and cold rolling the hot rolled steel sheet, then annealing it.

7 Claims, 6 Drawing Sheets

(51) Int. Cl.

| | |
|---|---|
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/44* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/58* | (2006.01) |
| *C23C 2/26* | (2006.01) |

(52) U.S. Cl.
CPC ............. *C21D 6/005* (2013.01); *C21D 6/007* (2013.01); *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/02* (2013.01); *C22C 38/06* (2013.01); *C22C 38/44* (2013.01); *C22C 38/48* (2013.01); *C22C 38/50* (2013.01); *C22C 38/52* (2013.01); *C22C 38/54* (2013.01); *C22C 38/58* (2013.01); *C23C 2/26* (2013.01); *C21D 2211/001* (2013.01); *C21D 2211/002* (2013.01); *C21D 2211/004* (2013.01); *C21D 2211/005* (2013.01); *C21D 2211/008* (2013.01)

(58) Field of Classification Search
CPC .............. C21D 2211/008; C21D 6/008; C21D 8/0226; C21D 8/0263; C21D 6/005; C21D 8/0236; C21D 1/18; C21D 1/25; C21D 2211/00; C21D 2211/004; C21D 2211/009; C21D 6/004; C21D 6/007; C21D 8/005; C21D 8/0205; C21D 8/021; C21D 8/0273; C21D 8/0426; C21D 8/0463; C21D 9/48; C21D 1/02; C21D 1/20; C21D 6/02; C21D 8/0215; C21D 8/0415; C21C 7/04; C21C 7/06
See application file for complete search history.

(56) References Cited

FOREIGN PATENT DOCUMENTS

| | | |
|---|---|---|
| JP | 2000-248338 A | 9/2000 |
| JP | 2006-249521 A | 9/2006 |
| JP | 2014-25132 A | 2/2014 |
| JP | 5910396 B2 | 4/2016 |
| JP | 2017-145469 A | 8/2017 |
| JP | 6388099 B1 | 9/2018 |

* cited by examiner

STEEL SHEET AND METHOD FOR PRODUCING SAME

FIELD

The present invention relates to steel sheet and a method for producing the same.

BACKGROUND

Galvanized steel sheet is widely used in the construction, automotive, and other fields from the viewpoint of improvement of the corrosion resistance of structural members. However, if assembling structures or vehicle bodies etc., by spot welding etc., galvanized steel sheets with each other or a galvanized steel sheet with another steel sheet, molten zinc will sometimes penetrate the steel of the galvanized steel sheet or other steel sheet and cause cracks at the inside of the steel sheet. This phenomenon is called liquid metal embrittlement (LME) cracking. In the prior art, various proposals have been made to keep such LME cracking from occurring.

PTL 1 describes a steel sheet comprising a base metal having a predetermined chemical composition, wherein the steel sheet has, from a surface of the base metal to a depth of 5.0 μm or more, an internal oxidized layer in which at least part of a crystal grain boundary is covered with oxides, and wherein in a region from the surface of the base metal to a depth of 5.0 μm, a grain boundary coverage ratio of the oxides is 60% or more, and the steel sheet has a tensile strength of 900 MPa or more. Further, PTL 1 describes that the steel sheet has an internal oxide layer in which at least one part of crystal grain boundaries of the base metal is covered by oxides of easily oxidizable elements such as Si, Mn and so on, and when the crystal grain boundaries are covered by oxides, it is possible to inhibit penetration of molten metal into the crystal grain boundaries during welding, and also to suppress the occurrence of LME cracking during welding.

PTL 2 describes a galvannealed steel material having a galvannealed layer on a surface of a steel material, wherein the steel material comprises, by mass %, C: 0.01 to 0.3%, Si: 0.01 to 2.0%, Mn: 0.1 to 3.0%, S: 0.015% or less, Al: 0.001 to 0.5%, N: 0.0005 to 0.006%, one or more of Nb, V, and Zr in a total of 0.01 to 0.60%, a sensitivity index E value of liquid metal embrittlement: more than 0.24 wherein the E value is represented by the following formula: E value=[% C]+[% Si]/17+[% Mn]/7.5+[% Ni]/17+[% Nb]/2+[% V]/1.5+[% Zr]/2, a B content of 3 ppm or more and −102×E+61 ppm or less, and a balance of Fe and unavoidable impurities. Further, PTL 2 describes that by controlling the content of B contained in the steel material in accordance with the constituents of the steel material determining the tensile strength of the base metal, it is possible to make it segregate at the austenite grain boundaries of a weld heat affected zone structure and maintain an effective amount of solid solution of B for suppressing penetration of the molten plating and thereby suppress the occurrence of liquid metal embrittlement.

CITATIONS LIST

Patent Literature

[PTL 1] Japanese Patent No. 6388099
[PTL 2] Japanese Unexamined Patent Publication No. 2006-249521

SUMMARY

Technical Problem

PTL 2 further describes that penetration of low melting point metal to the grain boundaries is suppressed by B segregating and concentrating at the grain boundaries in an austenite temperature region of about 900° C. or more. However, in welding methods with relatively small amounts of input heat, for example, welding methods like spot welding where the time held at a high temperature is relatively short, sometimes even with the heating at the time of welding, the B in the steel sheet cannot sufficiently segregate at the grain boundaries. In such a case, it is not possible to reliably keep zinc and other molten metal from penetrating the grain boundaries, as a result, LME cracking may occur inside the steel sheet. Therefore, in this technical field, a steel sheet having improved LME resistance, which can more reliably suppress penetration of zinc and other molten metal into the grain boundaries even in spot welding and other such specific welding methods, has been sought.

Further, in the automotive field etc., work is proceeding on development of high strength steel sheet for satisfying the demand for lighter weight of vehicle bodies, but it is known that the above-mentioned LME cracking remarkably occurs in particular at the time of spot welding high strength galvanized steel sheet, for example, galvanized high strength TRIP steel sheet (transformation induced plasticity steel sheet) etc. On the other hand, there is also the problem that along with the higher strength of steel sheet, in general the shapeability of the steel sheet, for example, the ductility and other mechanical properties, falls.

Therefore, an object of the present invention is to provide a steel sheet having improved LME resistance by a novel constitution, in particular LME resistance improved even with spot welding or other welding methods, along with high strength and excellent ductility, and a method for producing the same.

Solution to Problem

The present invention to achieve the above object is as follows:

(1) A steel sheet having a chemical composition comprising, by mass %,
C: 0.050 to 0.300%,
Si: 0.01 to 2.00%,
Mn: 0.10 to 4.00%,
P: 0.0001 to 0.0200%,
S: 0.0001 to 0.0200%,
N: 0.0001 to 0.0200%,
Al: 0.001 to 1.000%,
Ti: 0.001 to 0.500%,
B: 0.0007 to 0.0100%,
Co: 0 to 0.50%,
Ni: 0 to 1.00%,
Mo: 0 to 1.00%,
Cr: 0 to 2.000%,
Nb: 0 to 0.500%,
V: 0 to 0.500%,
Cu: 0 to 0.500%,
W: 0 to 0.100%,
Ta: 0 to 0.100%,
Sn: 0 to 0.050%,
Sb: 0 to 0.050%,
As: 0 to 0.050%,
Mg: 0 to 0.0500%, Ca: 0 to 0.050%,
Y: 0 to 0.050%,
Zr: 0 to 0.050%,
La: 0 to 0.050%,
Ce: 0 to 0.050%, and
a balance of Fe and impurities, wherein
the steel sheet comprises, by area ratio,
ferrite: 5.0 to 40.0%,
total of martensite and tempered martensite: 10.0 to 60.0%,
bainite: 5.0 to 40.0%, and
retained austenite: 5.0 to 25.0%,
when there are remaining structures, the remaining structures consist of 10.0% or less of pearlite,
in a surface layer region down to a depth of 100 μm from the surface in the sheet thickness direction, $(Fe, Mn)_2B$ precipitates having a circle equivalent diameter of 50 to 300 nm are present in a number density of 1/500 $\mu m^2$ or more.

(2) The steel sheet according to above (1), comprising one or more of
Co: 0.01 to 0.50%,
Ni: 0.01 to 1.00%,
Mo: 0.01 to 1.00%,
Cr: 0.001 to 2.000%,
Nb: 0.001 to 0.500%,
V: 0.001 to 0.500%,
Cu: 0.001 to 0.500%,
W: 0.001 to 0.100%,
Ta: 0.001 to 0.100%,
Sn: 0.001 to 0.050%,
Sb: 0.001 to 0.050%,
As: 0.001 to 0.050%,
Mg: 0.0001 to 0.0500%,
Ca: 0.001 to 0.050%,
Y: 0.001 to 0.050%,
Zr: 0.001 to 0.050%,
La: 0.001 to 0.050%, and
Ce: 0.001 to 0.050%.

(3) The steel sheet according to above (1) or (2), wherein the steel sheet has a tensile strength of 700 MPa or more and a breaking elongation of 3.0% or more.

(4) The steel sheet according to any one of above (1) to (3), wherein the $(Fe, Mn)_2B$ precipitates having a circle equivalent diameter of 50 to 300 nm are present in a number density of 1 to 500/500 $\mu m^2$.

(5) The steel sheet according to any one of above (1) to (4), wherein at least one surface of the steel sheet has a plating layer containing zinc.

(6) A method for producing a steel sheet, comprising:
continuously casting a molten steel having the chemical composition according to above (1) or (2) to form a steel slab, wherein the continuously casting includes introducing more than 10 ppm and less than 100 ppm of oxygen into the surface layer of the steel slab,
hot rolling including finish rolling the steel slab, wherein a completion temperature of the finish rolling is 650 to 950° C.,
coiling the obtained hot rolled steel sheet at a coiling temperature of 400 to 700° C., and
cold rolling the hot rolled steel sheet, then annealing it.

(7) The method for producing steel sheet according to above (6), wherein in the annealing after the cold rolling, a plating layer containing zinc is formed on at least one surface of the steel sheet.

Advantageous Effects of Invention

According to the present invention, by using steel sheet containing B precipitates comprised of $(Fe, Mn)_2B$ in a predetermined amount in a surface layer region of the steel sheet, even in a welding method like spot welding with a relatively small amount of input heat, when grain boundaries in the steel sheet move due to the heating at the time of welding, the $(Fe, Mn)_2B$ precipitates pin the grain boundaries and at least part of the $(Fe, Mn)_2B$ precipitates dissolve on the grain boundaries whereby solute B can be supplied preferentially to the grain boundaries and segregate there, as a result it is possible to remarkably improve the LME resistance of the steel sheet. In addition, according to the present invention, it is possible to achieve a high strength of 700 MPa or more and a high ductility of a breaking elongation of 3.0% or more.

DESCRIPTION OF EMBODIMENTS

<Steel Sheet>

The steel sheet according to an embodiment of the present invention has a chemical composition comprising, by mass %,
C: 0.050 to 0.300%,
Si: 0.01 to 2.00%,
Mn: 0.10 to 4.00%,
P: 0.0001 to 0.0200%,
S: 0.0001 to 0.0200%,
N: 0.0001 to 0.0200%,
Al: 0.001 to 1.000%,
Ti: 0.001 to 0.500%,
B: 0.0007 to 0.0100%,
Co: 0 to 0.50%,
Ni: 0 to 1.00%,
Mo: 0 to 1.00%,
Cr: 0 to 2.000%,
Nb: 0 to 0.500%,
V: 0 to 0.500%,
Cu: 0 to 0.500%,
W: 0 to 0.100%,
Ta: 0 to 0.100%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and a balance of Fe and impurities, wherein
the steel sheet comprises, by area ratio,
ferrite: 5.0 to 40.0%,
total of martensite and tempered martensite: 10.0 to 60.0%,
bainite: 5.0 to 40.0%, and
retained austenite: 5.0 to 25.0%,
when there are remaining structures, the remaining structures consist of 10.0% or less of pearlite,
in a surface layer region down to a depth of 100 μm from the surface in the sheet thickness direction, $(Fe, Mn)_2B$ precipitates having a circle equivalent diameter of 50 to 300 nm are present in a number density of $1/500\ \mu m^2$ or more.

As explained previously, in spot welding or another welding method where the time held at a high temperature is relatively short, even with the heating at the time of welding, sometimes the B in the steel sheet cannot sufficiently segregate at the grain boundaries. In such a case, there is the problem of the zinc or other molten metal in the plating layer melted due to the heat at the time of welding penetrating the grain boundaries of the weld zone structure and causing LME cracking inside the steel sheet. Explaining this in more detail, "LME cracking" in spot welding is the phenomenon where the galvanized layer at the steel sheet surface is melted by the heat affect during the spot welding, and the tensile stress generated by thermal contraction of the heat affected zone in the subsequent cooling process or the stress generated when the steel sheet is pressed against by the electrodes at the time of spot welding, etc., causes the molten zinc to penetrate the grain boundaries of the steel and thereby cause macro cracking.

Figure 1:
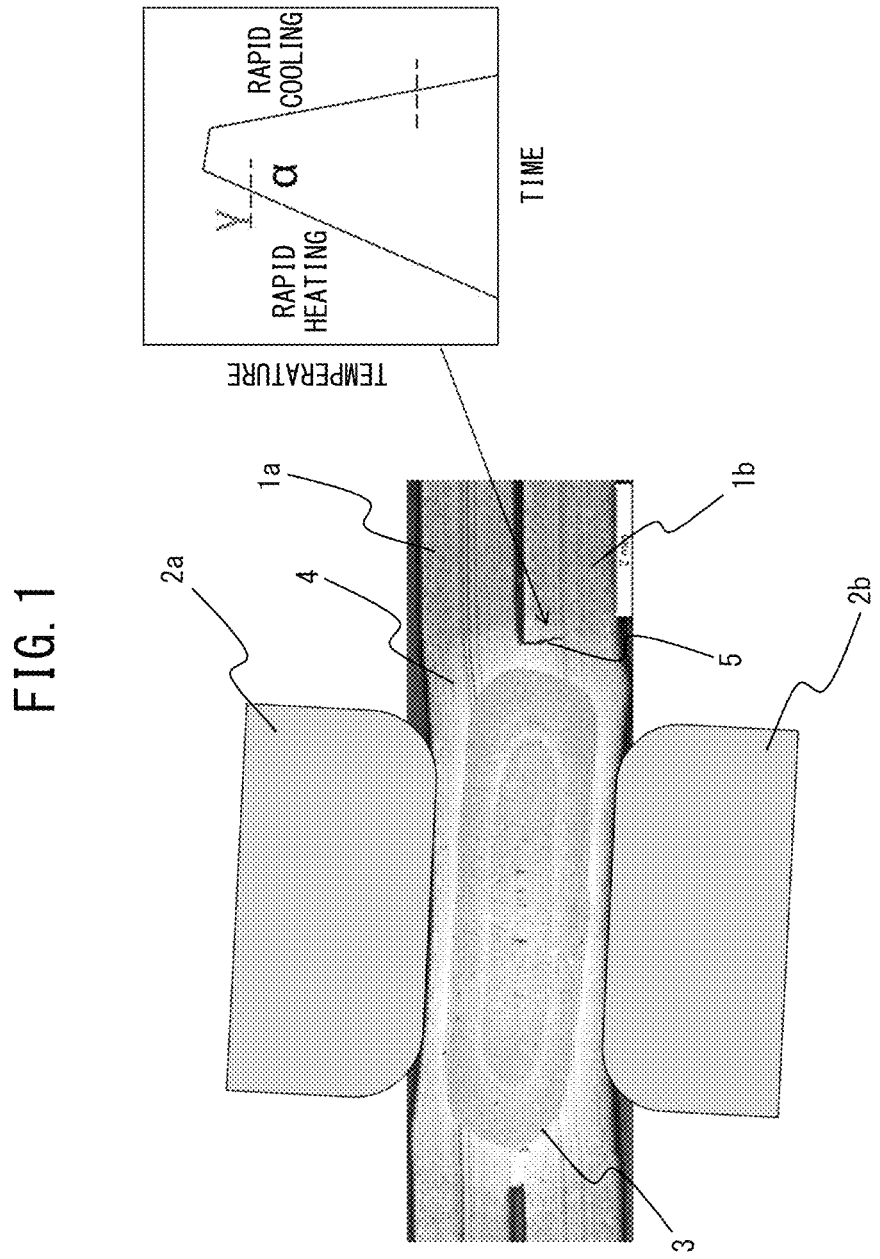
FIG. 1 is a view schematically showing LME cracking occurring at a heat affected zone at the time of spot welding.

FIG. 1 is a view schematically showing LME cracking occurring at a heat affected zone at the time of spot welding. As shown in FIG. 1, by superposing a steel sheet 1a and steel sheet 1b and spot welding them using a pair of electrodes 2a and 2b, it is possible to form a nugget (melted and solidified part) 3 and join the two steel sheets 1a and 1b. At that time, as shown in FIG. 1, LME cracking 5 sometimes occurs in the heat affected zone 4 formed around the nugget 3. The heat affected zone 4 is rapidly heated from room temperature up to a high temperature in several seconds at the time of spot welding, then immediately rapidly cooled. Due to this heat history, in the heat affected zone 4, steel which had been in the ferrite (a) state is transformed once to the austenite (γ) state, then generally is rapidly cooled in about 1 to 2 seconds or so.

Figure 2:
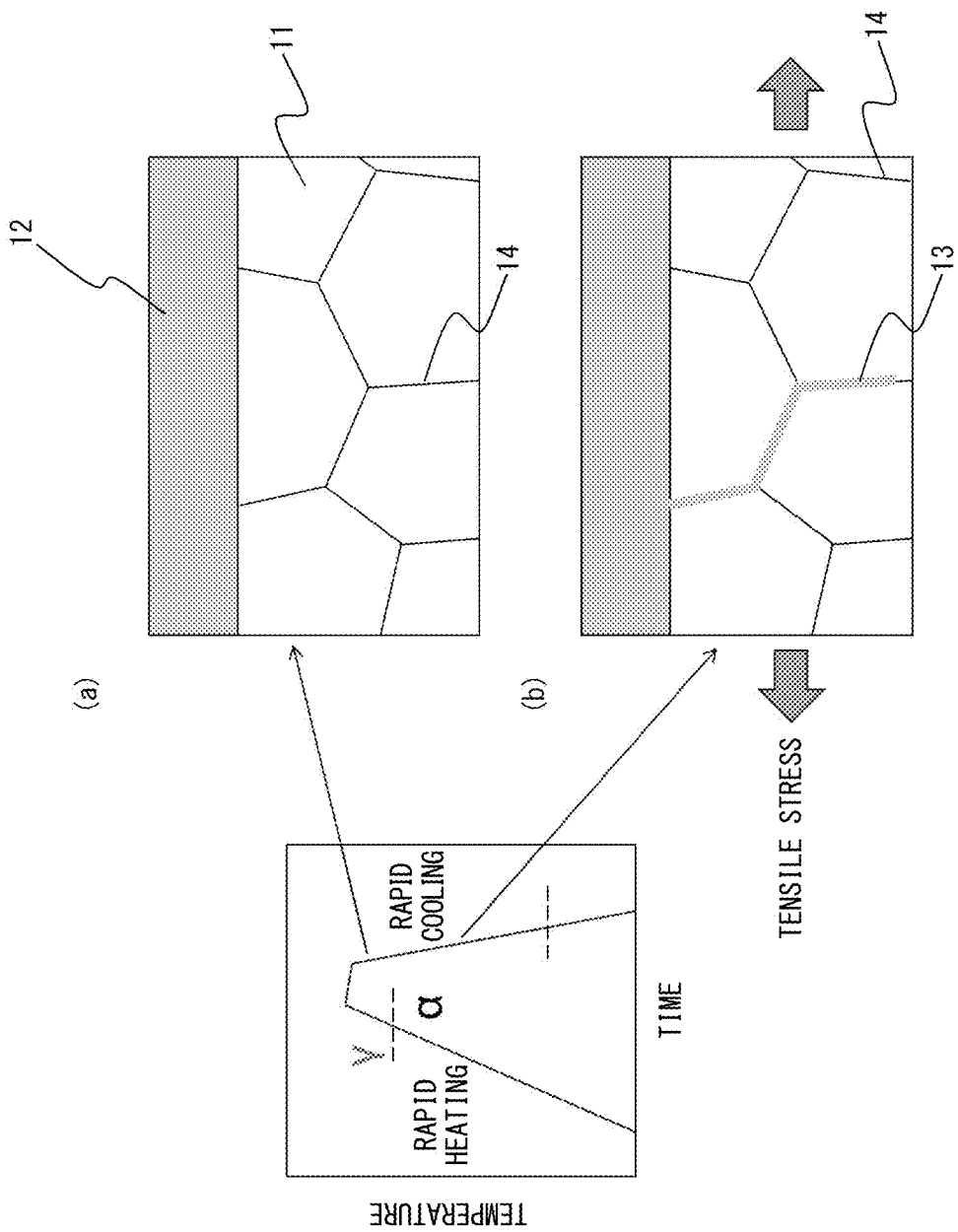
FIG. 2 is a view schematically showing the states of a base metal steel sheet and galvanized layer at the time of spot welding.

FIG. 2 is a view schematically showing the states of a base metal steel sheet and galvanized layer at the time of spot welding. Referring to FIG. 2, the structure in the base metal steel sheet 11 after rapid heating by spot welding changes from the ferrite (a) state to the austenite (γ) state. The zinc in the plating layer 12 arranged on top thereof is in the molten state (FIG. 2(a)). Next, in the immediately succeeding rapid cooling process, the heat affected zone thermally contracts generating tensile stress etc., which triggers the penetration of this molten zinc 13 into the grain boundaries 14 in the base metal steel sheet 11 (FIG. 2(b)) and thereby causes LME cracking.

Figure 3:
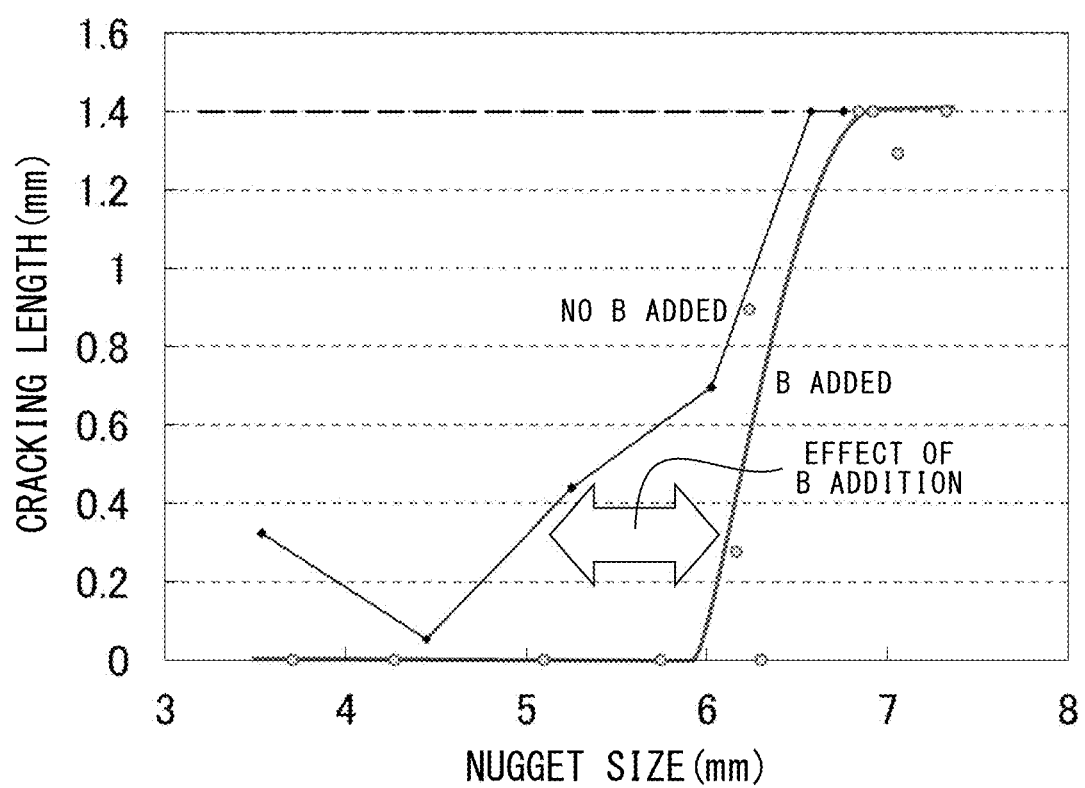
FIG. 3 is a graph showing the effect of addition of B on the relationship between the LME cracking length and nugget size when using a sheet thickness 1.4 mm steel sheet sample.

To suppress this LME cracking, it is extremely important to prevent penetration of molten zinc 13 into the grain boundaries such as shown in FIG. 2(b). Therefore, for example, as one solution, the method of causing solute B to segregate at the grain boundaries to thereby prevent penetration of molten zinc to the grain boundaries may be considered. FIG. 3 is a graph showing the effect of addition of B on the relationship between the LME cracking length and nugget size when using a sheet thickness 1.4 mm steel sheet sample. The nugget size corresponds to the length of the melted zone at the time of welding. For this reason, the longer the nugget size, the greater the amount of input heat and therefore the greater the amount of zinc melted and as a result generally the longer the LME cracking length. Referring to FIG. 3, it will be understood that if not adding B to the steel sheet as a constituent element, the nugget size at which LME cracking occurs becomes smaller and therefore LME cracking occurs with a smaller amount of input heat. On the other hand, as clear from FIG. 3, if adding B as a constituent element, LME cracking does not occur until an amount of input heat where the nugget size becomes about 6 mm or so. Therefore, it will be understood that by adding B, LME cracking can be kept from occurring even in the case of welding by a relatively large amount of input heat.

Figure 4:
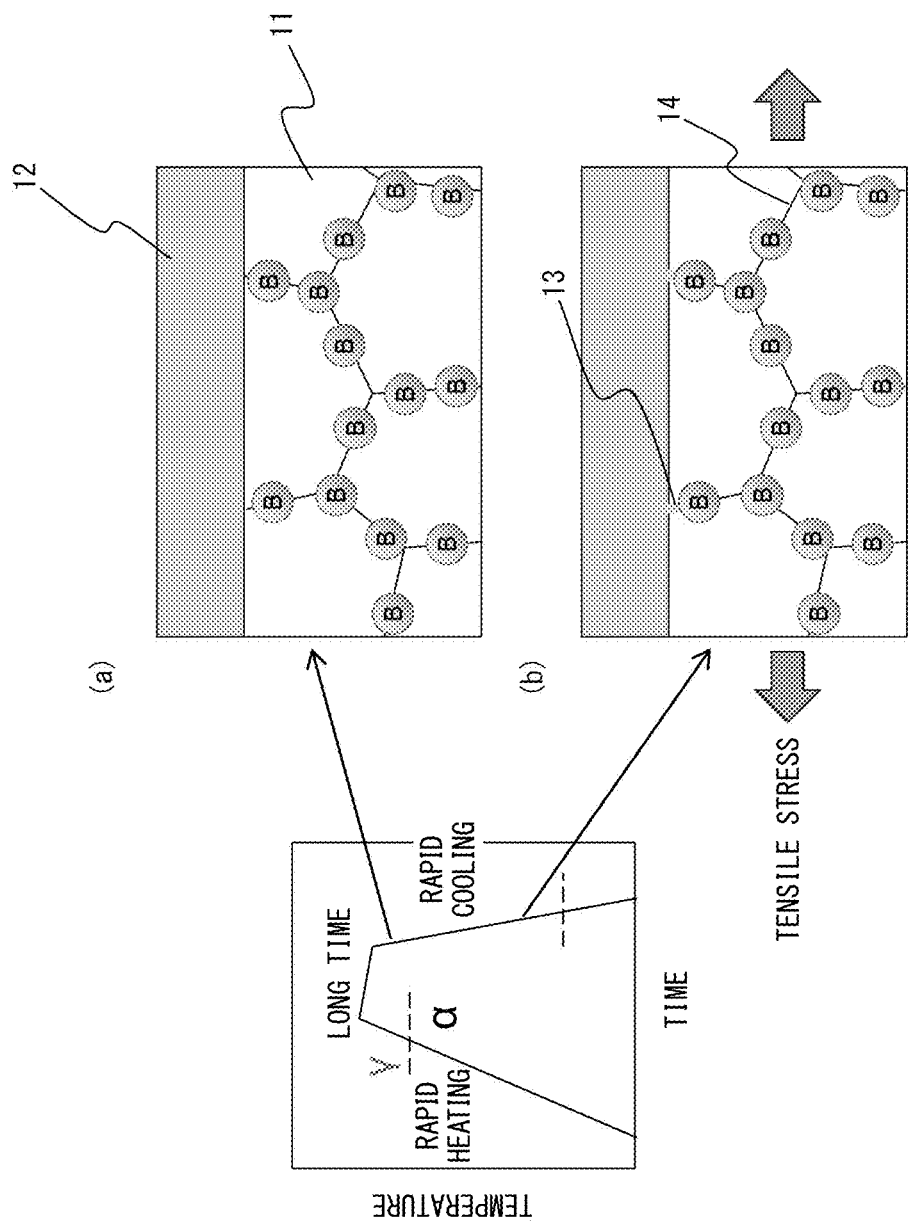
FIG. 4 is a view schematically showing segregation of solute B at the grain boundaries at the time of welding and the resultant suppression of LME cracking.

Next, the mechanism by which solute B keeps LME cracking from occurring will be explained. FIG. 4 is a view schematically showing segregation of solute B at the grain boundaries at the time of welding and the resultant suppression of LME cracking. Explained in more detail referring to FIG. 4, since B is an element having the property of segregating at grain boundaries, by using such a property and making the B dissolved in the base metal steel sheet 11 segregate at the grain boundaries 14 when heating at the time of welding (FIG. 4(a)), the solute B segregated at the grain boundaries can keep the penetration of molten zinc 13 into the steel sheet to, for example, only the extreme surfacemost layer of the base metal steel sheet (several lam or so) (FIG. 4(b)). In particular, in the case of joint welding with a relatively large amount of input heat etc., the time held at a high temperature becomes a relatively long time. Therefore, as shown in FIG. 4(a), it is possible to sufficiently supply and make segregate the solute B to the grain boundaries 14 in the relatively long time heating process at the time of welding, so that solute B can reliably keep molten zinc 13 from penetrating to the inside of the steel sheet.

However, even among the various welding methods, for example, in spot welding and other welding methods with relatively small amounts of input heat, the time holding at a high temperature is relatively short. Therefore, as shown in FIG. 5(a), in the instantaneously short time heating process at the time of spot welding, sometimes it is not possible to sufficiently supply solute B to the grain boundaries 14 to make it segregate there. In such a case, the tensile stress generated in the subsequent cooling process etc., trigger the penetration of molten zinc 13 into the grain boundaries 14 where solute B has not segregated (FIG. 5(b)) and thereby LME cracking occurs.

Therefore, the inventors studied the structure of steel sheet etc., enabling efficient supply and/or segregation of solute B to the grain boundaries at the time of welding. As a result, the inventors discovered that by using steel sheet containing a predetermined amount of specific B precipitates at the surface layer region of the steel sheet, more specifically B precipitates comprised of $(Fe, Mn)_2B$, it is possible to make solute B be sufficiently supplied and/or segregate at the grain boundaries even in welding methods like spot welding where the amount of input heat is relatively small. As a result, they discovered that the LME resistance of the steel sheet can be remarkably improved.

Figure 6:
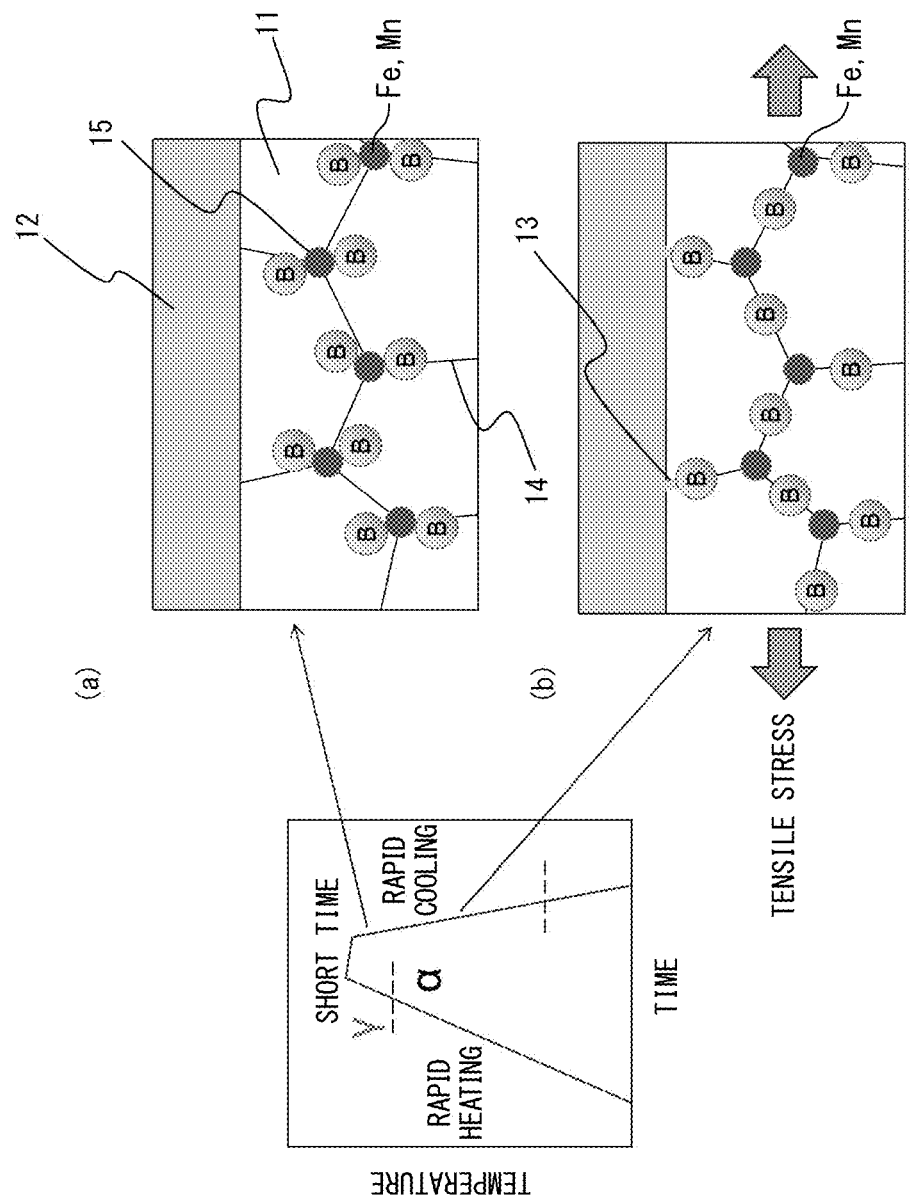
FIG. 6 is a view schematically showing behavior of solute B in segregating when using the steel sheet according to an embodiment of the present invention for spot welding.

FIG. 6 is a view schematically showing behavior of solute B in segregating when using the steel sheet according to an embodiment of the present invention for spot welding. If explaining this in more detail referring to FIG. 6, in the steel sheet according to an embodiment of the present invention, at the surface layer region of the base metal steel sheet 11 under the plating layer 12, a predetermined amount of B precipitates 15 comprised of $(Fe, Mn)_2B$ are present. If spot welding in such a state, when the grain boundaries 14 move due to the heating at the time of that spot welding, as shown in FIG. 6(*a*), the grain boundaries 14 are pinned by the $(Fe, Mn)_2B$ present at the surface layer region of the base metal steel sheet 11. As a result, in the surface layer region of the base metal steel sheet 11, there will also be $(Fe, Mn)_2B$ at the grain boundaries.

Figure 5:
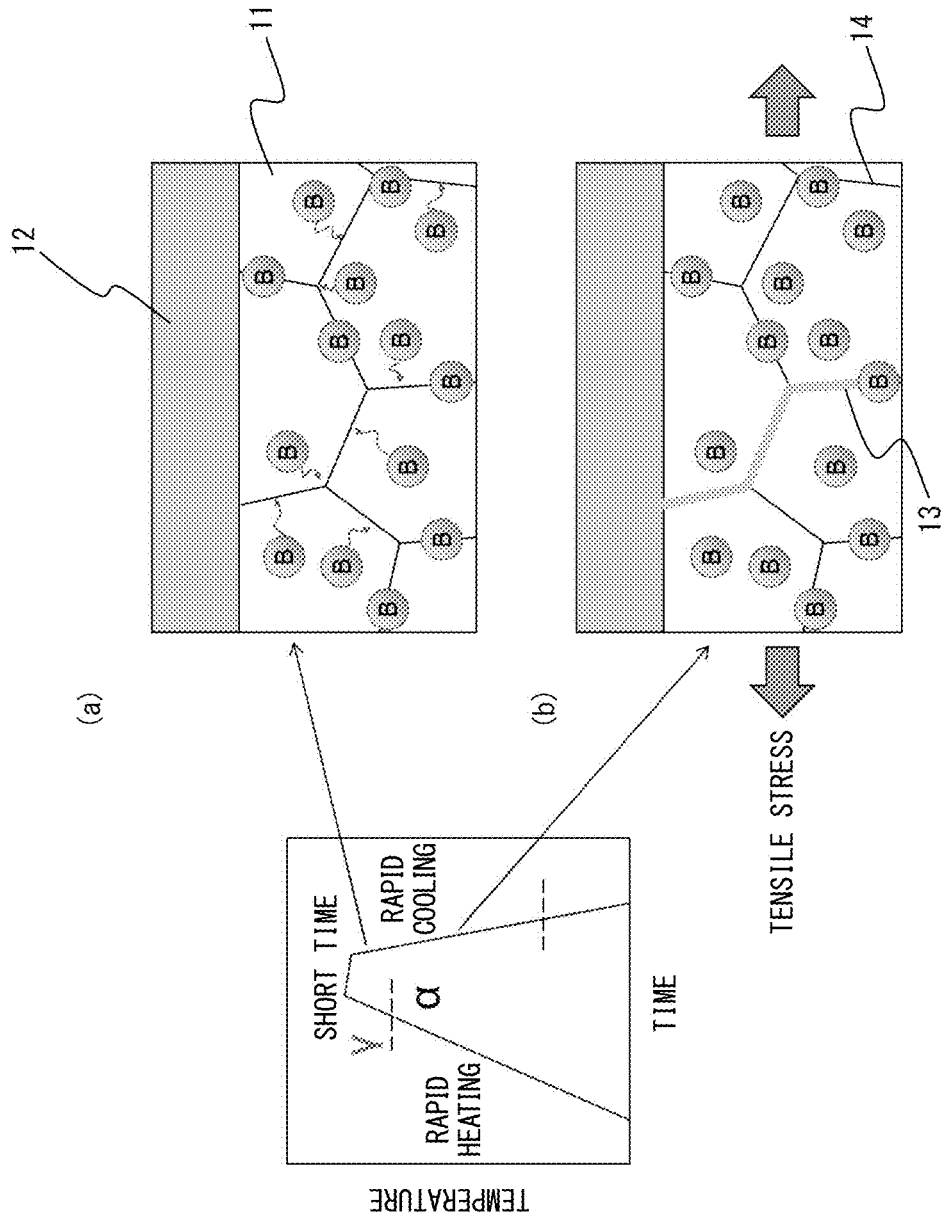
FIG. 5 is a view schematically showing typical behavior of solute B in the case of spot welding etc.

Further, with the instantaneous heating at the austenite region at the time of spot welding, in the above way, $(Fe, Mn)_2B$ precipitates pin the grain boundaries 14. At least part of the $(Fe, Mn)_2B$ precipitates, preferably the majority of them, dissolve on the grain boundaries 14 whereby solute B is preferentially supplied along the grain boundaries 14 and segregate there. Therefore, even if in the subsequent rapid cooling process the heat affected zone thermally contracts and tensile stress is generated or even if stress is generated at the steel sheet surface layer due to being pressed against by the electrodes at the time of spot welding, the solute B segregated along the grain boundaries 14 can reliably keep molten zinc 13 from penetrating to the inside of the steel sheet (FIG. 6(*b*)). According to the present invention, in steel sheet, by utilizing the B precipitates comprised of $(Fe, Mn)_2B$ and using these to pin the grain boundaries, it is possible to make the solute B immediately be supplied to and segregate at the grain boundaries during the heating at the time of welding. Therefore, compared with when making solute B be supplied to and segregate at the grain boundaries from relatively far places in the steel sheet such as shown in FIG. 5, it becomes possible to reliably keep zinc and other molten metal in the plating layer from penetrating to the inside of the steel sheet even in a welding method like spot welding where the amount of input heat is relatively small.

In FIG. 6, to facilitate understanding, the case of a so-called "plated steel sheet" including a plating layer on the surface of a base metal steel sheet was explained in detail, but the steel sheet according to the present invention is not necessarily limited to such a plated steel sheet and also encompasses steel sheet which has not been plated. The reason is that even with steel sheet which has not been plated, for example, when spot welding it with galvanized steel sheet, the zinc melted in that galvanized steel sheet will sometimes penetrate the steel sheet which has not been plated and thereby cause LME cracking.

Further, the inventors discovered that, in addition to the above constitution, by suitably controlling the composition and structure of the steel sheet, it is possible to achieve a high strength and high ductility, more specifically a high strength of 700 MPa or more and a high ductility of a breaking elongation of 3.0% or more.

Below, the steel sheet according to an embodiment of the present invention will be explained in detail. In the following explanation, the "%" of the units of contents of the elements, unless particularly indicated otherwise, mean "mass %".

[C: 0.050 to 0.300%]

Carbon (C) is an element required for improvement of the strength of steel sheet. If the C content is less than 0.050%, sufficient strength cannot be obtained, so the C content is 0.050% or more. The C content may also be 0.060% or more, 0.080% or more, or 0.100% or more. On the other hand, if the C content is more than 0.300%, the strength of the weld zone increases and the LME resistance falls, so the C content is 0.300% or less. The C content may also be 0.280% or less, 0.250% or less, or 0.220% or less.

[Si: 0.01 to 2.00%]

Silicon (Si) is an element suppressing the precipitation of iron-based carbides and contributing to improvement of strength and shapeability. However, if the Si content is less than 0.01%, sometimes the above effect cannot be sufficiently obtained. In addition, rendering the Si content less than 0.01% would require time for refining and would invite a drop in productivity. Therefore, the Si content is 0.01% or more. The Si content may also be 0.10% or more, 0.50% or more, or 1.00% or more. On the other hand, if excessively adding Si, the retained austenite excessively stabilizes and the austenite region becomes broader after welding, so the LME resistance of the steel sheet is made to fall. Therefore, the Si content is 2.00% or less. The Si content may also be 1.80% or less, 1.60% or less, or 1.50% or less.

[Mn: 0.10 to 4.00%]

Manganese (Mn) is an element which raises the hardenability and contributes to improvement of the steel sheet strength. Further, Mn is an element essential for forming B precipitates comprised of $(Fe, Mn)_2B$. However, if the Mn content is less than 0.10%, sometimes the above B precipitates cannot be sufficiently formed. In addition, rendering the Mn content less than 0.10% would require time for refining and would invite a drop in productivity. Therefore, the Mn content is 0.10% or more. The Mn content may also be 0.50% or more, 0.70% or more, or 1.00% or more. On the other hand, if excessively adding Mn, the austenite phases in the steel sheet stabilize and the austenite phases remain after welding and cause the LME resistance of the steel sheet to fall. Therefore, the Mn content 4.00% or less. The Mn content may also be 3.50% or less, 3.20% or less, or 3.00% or less.

[P: 0.0001 to 0.0200%]

Phosphorus (P) is an element having the action of raising the steel sheet strength and suppressing the penetration of molten zinc to the steel sheet structure. However, if the P content is less than 0.0001%, the above effect sometimes cannot be sufficiently obtained. In addition, rendering the P content less than 0.0001% would require time for refining and would invite a drop in productivity. Therefore, the P content is 0.0001% or more. The P content may also be 0.0005% or more, 0.0010% or more, or 0.0020% or more. On the other hand, if the P content is more than 0.0200%, sometimes P segregates at the crystal grain boundaries causing the steel sheet to become brittle and making the LME resistance fall. Therefore, the P content is 0.0200% or less. The P content may also be 0.0180% or less, 0.0150% or less, or 0.0120% or less.

[S: 0.0001 to 0.0200%]

Sulfur (S) is an element causing hot brittleness and, further, detracts from weldability and corrosion resistance. However, rendering the S content less than 0.0001% would require time for refining and would invite a drop in productivity. Therefore, the S content is 0.0001% or more. The S content may also be 0.0005% or more, 0.0010% or more, or 0.0020% or more. On the other hand, if the S content is more than 0.0200%, embrittlement of the steel sheet is invited and the LME resistance sometimes falls. Therefore, the S content is 0.0200% or less. The S content may also be 0.0180% or less, 0.0150% or less, or 0.0120% or less.

[N: 0.0001 to 0.0200%]

Nitrogen (N) is an element forming nitrides and detracting from stretch flangeability and further becoming a cause of blowholes at the time of welding. However, rendering the N content less than 0.0001% would require time for refining and would invite a drop in productivity. Therefore, the N content is 0.0001% or more. The N content may also be 0.0005% or more, 0.0010% or more, or 0.0020% or more. On the other hand, if N is more than 0.0200%, the stretch flangeability remarkably falls and, further, at the time of welding, blowholes are formed. In addition, if N is more than 0.0200%, boron nitrides (BN) are formed, formation of (Fe, Mn)$_2$B is obstructed, and as a result the LME resistance sometimes falls. Therefore, the N content is 0.0200% or less. The N content may also be 0.0180% or less, 0.0150% or less, or 0.0120% or less.

[Al: 0.001 to 1.000%]

Aluminum (Al) is a deoxidizing element. Further, it is an element suppressing the formation of iron-based carbides and contributing to the improvement of strength. However, if the Al content is less than 0.001%, the deoxidizing effect cannot be sufficiently obtained. In addition, rendering the Al content less than 0.001% would require time for refining and would invite a drop in productivity. Therefore, the Al content is 0.001% or more. The Al content may also be 0.005% or more, 0.008% or more, or 0.010% or more. On the other hand, if the Al content is more than 1.000%, ferrite transformation in the steel sheet is promoted and sometimes sufficient strength cannot be obtained. Therefore, the Al content is 1.000% or less. The Al content may also be 0.800% or less, 0.500% or less, or 0.300% or less.

[Ti: 0.001 to 0.500%]

Titanium (Ti) is an element contributing to improvement of the steel sheet strength by precipitation strengthening, grain-refining strengthening by suppression of growth of crystal grains, and dislocation strengthening through suppression of recrystallization. Further, Ti forms titanium nitrides to consume the solute nitrogen in the steel when producing the steel sheet according to an embodiment of the present invention and thereby also has the effect of obstructing B bonding with the solute nitrogen to form boron nitrides (BN) and promoting the formation of (Fe, Mn)$_2$B. However, if the Ti content is less than 0.001%, sometimes the above effect cannot be sufficiently obtained. In addition, rendering the Ti content less than 0.001% would require time for refining and would invite a drop in productivity. Therefore, the Ti content is 0.001% or more. The Ti content may also be 0.005% or more, 0.008% or more, or 0.010% or more. On the other hand, if the Ti content is more than 0.500%, bainite transformation in the steel sheet is suppressed and sufficient ductility sometimes cannot be obtained. Therefore, the Ti content is 0.500% or less. The Ti content may also be 0.400% or less, 0.300% or less, or 0.100% or less.

[B: 0.0007 to 0.0100%]

Boron (B) is an element segregating at the grain boundaries and contributing to improvement of the LME resistance at the time of welding. However, if the B content is less than 0.0007%, B precipitates comprised of (Fe, Mn)$_2$B are not formed at all or are formed in a small amount and B cannot be made to sufficiently segregate at the grain boundaries, so the effect of improvement of the LME resistance cannot be sufficiently obtained. Therefore, the B content is 0.0007% or more. The B content may also be 0.0010% or more, 0.0015% or more, or 0.0020% or more. On the other hand, if the B content is more than 0.0100%, coarse carbides and/or nitrides are formed, so the above effect becomes saturated, the steel slab easily cracks, and the ductility falls. Therefore, the B content is 0.0100% or less. The B content may also be 0.0080% or less, 0.0060% or less, or 0.0050% or less.

The basic chemical composition of the steel sheet according to an embodiment of the present invention was as explained above. The steel sheet may also contain the following elements in accordance with need.

[Co: 0 to 0.50%]

Cobalt (Co) is a carbide-forming element and an element effective for causing the formation of precipitates and securing the strength of a hardened member and is an element contributing to improvement of the LME resistance as well. To sufficiently obtain that effect, the Co content is preferably 0.01% or more. The Co content may also be 0.02% or more, 0.03% or more, or 0.04% or more. On the other hand, if the Co content is more than 0.50%, ferrite transformation and/or pearlite transformation in the steel sheet is promoted and sometimes sufficient strength cannot be obtained. Therefore, the Co content is 0.50% or less. The Co content may also be 0.40% or less, 0.30% or less, or 0.20% or less.

[Ni: 0 to 1.00%]

Nickel (Ni) is an element contributing to improvement of strength and an element contributing also to improvement of the LME resistance. To sufficiently obtain that effect, the Ni content is preferably 0.01% or more. The Ni content may also be 0.02% or more, 0.03% or more, or 0.04% or more. On the other hand, if the Ni content is more than 1.00%, ferrite transformation in the steel sheet is suppressed and sometimes the ductility falls. Therefore, the Ni content is 1.00% or less. The Ni content may also be 0.90% or less, 0.80% or less, or 0.70% or less.

[Mo: 0 to 1.00%]

Molybdenum (Mo) is an element raising the hardenability of steel and contributing to improvement of strength and an element also contributing to improvement of the LME resistance. To sufficiently obtain the above effect, the Mo content is preferably 0.01% or more. The Mo content may also be 0.02% or more, 0.03% or more, or 0.04% or more. On the other hand, if the Mo content is more than 1.00%, ferrite transformation in the steel sheet is suppressed and sometimes the ductility falls. Therefore, the Mo content is 1.00% or less. The Mo content may also be 0.90% or less, 0.80% or less, or 0.70% or less.

[Cr: 0 to 2.000%]

Chromium (Cr) is an element contributing to improvement of the strength and an element also contributing to improvement of the LME resistance. To sufficiently obtain the above effect, the Cr content is preferably 0.001% or more. The Cr content may also be 0.010% or more, 0.050% or more, or 0.100% or more. On the other hand, if the Cr content is more than 2.000%, sometimes the pickling ability, weldability, and hot workability fall. Further, concentration of carbon to the austenite in the annealing of the cold rolled sheet is suppressed, so in cooling the sheet down to room temperature after holding it at the annealing temperature, pearlite transformation is promoted, so sometimes a drop in strength is caused. Therefore, the Cr content is 2.000% or less. The Cr content may also be 1.500% or less, 1.300% or less, or 1.000% or less.

[Nb: 0 to 0.500%, V: 0 to 0.500%]

Niobium (Nb) and vanadium (V) are both elements contributing to improvement of the steel sheet strength by precipitation strengthening, grain-refining strengthening by suppression of growth of crystal grains, and dislocation strengthening through suppression of recrystallization and elements also contributing to improvement of the LME resistance. For this reason, one or more of the elements selected from these may be contained in accordance with need. To sufficiently obtain the above effect, Nb and V content are preferably made respectively 0.001% or more. They may also be 0.005% or more, 0.008% or more, or 0.010% or more. On the other hand, if the Nb and V contents are more than 0.500%, coarse carbides precipitate and the amount of solute C decreases, so the martensite fraction falls and sometimes sufficient strength cannot be obtained. Therefore, the Nb and V contents are respectively 0.500% or less. They may also be 0.400% or less, 0.300% or less, or 0.100% or less.

[Cu: 0 to 0.500%]

Copper (Cu) is an element contributing to improvement of strength and an element also contributing to improvement of the LME resistance. To sufficiently obtain the above effect, the Cu content is preferably 0.001% or more. The Cu content may also be 0.010% or more, 0.050% or more, or 0.100% or more. On the other hand, if the Cu content is more than 0.500%, embrittlement of the steel sheet is invited and sometimes the ductility falls. Therefore, Cu content is 0.500% or less. The Cu content may also be 0.400% or less, 0.350% or less, or 0.300% or less.

[W: 0 to 0.100%, Ta: 0 to 0.100%]

Tungsten (W) and tantalum (Ta) are both elements effective for control of the morphology of the carbides and increase of the strength of the steel and are elements also contributing to improvement of the LME resistance. For this reason, one or more elements selected from these may be contained in accordance with need. To sufficiently obtain the above effect, the W and Ta contents are respectively preferably 0.001% or more. They may also be 0.005% or more, 0.007% or more, or 0.010% or more. On the other hand, if the W and Ta contents are more than 0.100%, coarse carbides precipitate and the amount of solute C decreases, so the martensite fraction falls and sometimes sufficient strength cannot be obtained. Therefore, the W and Ta contents are respectively 0.100% or less. They may also be 0.080% or less, 0.060% or less, or 0.050% or less.

[Sn: 0 to 0.050%]

Tin (Sn) is an element contained in steel when using scrap as a raw material. The smaller the content the better. 0% is also possible. However, reducing the content to less than 0.001% invites an increase in the refining costs, so if Sn is contained, the lower limit is 0.001% or more. The Sn content may also be 0.002% or more, 0.003% or more, or 0.005% or more. On the other hand, if the Sn content is more than 0.050%, embrittlement of the steel sheet is invited and sometimes the ductility falls. Therefore, the Sn content is 0.050% or less. The Sn content may also be 0.040% or less, 0.030% or less, or 0.020% or less.

[Sb: 0 to 0.050%, As: 0 to 0.050%]

Antimony (Sb) and arsenic (As), like Sn, are contained when using scrap as a steel raw material and are elements strongly segregating at the grain boundaries. The smaller the content the better. 0% is also possible. However, reducing the content to less than 0.001% invites an increase in the refining costs, so if Sb and As are contained, the lower limits are respectively 0.001% or more. The Sb and As contents may also be respectively 0.002% or more, 0.003% or more, or 0.005% or more. On the other hand, if the Sb and As contents are more than 0.050%, embrittlement of the steel sheet is invited and sometimes the ductility falls, so the Sb and As contents are respectively 0.050% or less. They may also be 0.040% or less, 0.030% or less, or 0.020% or less.

[Mg: 0 to 0.0500%]

Magnesium (Mg) is an element able to control the morphology of the sulfides by trace addition and is an element also contributing to improvement of the LME resistance. To sufficiently obtain the above effect, the Mg content is preferably 0.0001% or more. The Mg content may also be 0.0005% or more, 0.0010% or more, or 0.0020% or more. On the other hand, if the Mg content is more than 0.0500%, embrittlement of the steel sheet is invited and sometimes the ductility falls. Therefore, Mg content is 0.0500% or less. The Mg content may also be 0.0400% or less, 0.0300% or less, or 0.0200% or less.

[Ca: 0 to 0.050%, Y: 0 to 0.050%, Zr: 0 to 0.050%, La: 0 to 0.050%]

Calcium (Ca), yttrium (Y), zirconium (Zr), and lanthanum (La), like Mg, are elements able to control the morphology of the sulfides by trace addition and are elements also contributing to improvement of the LME resistance. For this reason, one or more elements selected from these may be contained in accordance with need. To sufficiently obtain the above effect, the Ca, Y, Zr, and La contents are respectively preferably 0.001% or more. They may also be 0.002% or more, 0.003% or more, or 0.005% or more. On the other hand, if the Ca, Y, Zr, and La contents are more than 0.050%, embrittlement of the steel sheet is invited and sometimes the ductility falls. Therefore, the Ca, Y, Zr, and La contents are respectively 0.050% or less. They may also be 0.040% or less, 0.020% or less, or 0.010% or less.

[Ce: 0 to 0.050%]

Cerium (Ce) is an element able to control the morphology of the sulfides by trace addition and is an element also contributing to improvement of the LME resistance. To sufficiently obtain the above effect, the Ce content is preferably 0.001% or more. The Ce content may also be 0.002% or more, 0.003% or more, or 0.005% or more. On the other hand, if the Ce content is more than 0.050%, embrittlement of the steel sheet is invited and sometimes the ductility falls. Therefore, the Ce content is 0.050% or less. The Ce content may also be 0.040% or less, 0.020% or less, or 0.010% or less.

In the steel sheet according to an embodiment of the present invention, the balance other than the above elements is comprised of Fe and impurities. "Impurities" are constituents entering during various factors in the production process such as the ore, scrap, or other raw materials when industrially producing steel sheet and not intentionally added to the steel sheet according to an embodiment of the present invention (so-called "unavoidable impurities"). Further, "impurities" also include elements which are other than the constituents explained above and which are contained in the steel sheet to a level where the actions and effects distinctive to the elements do not affect the properties of the steel sheet according to an embodiment of the present invention.

Next, the structure of the steel sheet according to an embodiment of the present invention will be explained.

[Presence of $(Fe, Mn)_2B$ Precipitates at Surface Layer Region in 1/500 $\mu m^2$ or More Number Density]

In the steel sheet according to an embodiment of the present invention, in the surface layer region from the surface of that steel sheet (in the case where the steel sheet has a plating layer, the surface of the base metal steel sheet) down to a depth of 100 $\mu m$ in the sheet thickness direction, $(Fe, Mn)_2B$ precipitates having a circle equivalent diameter of 50 to 300 nm are present, in particular dispersed, in a 1/500 $\mu m^2$ or more number density. By $(Fe, Mn)_2B$ precipitates having a predetermined range of circle equivalent diameter being present or dispersed at the surface layer region of the steel sheet in such a number density, when the grain boundaries in the steel sheet move due to the heating at the time of welding, the grain boundaries are pinned by the $(Fe, Mn)_2B$ precipitates and as a result $(Fe, Mn)_2B$ precipitates can be reliably made present at the grain boundaries in the surface layer region of the steel sheet. In addition, during heating at the time of welding, in the above way, the $(Fe, Mn)_2B$ precipitates pin the grain boundaries and at least part of the (Fe, Mn)$_2$B precipitates dissolve on the grain boundaries whereby solute B can be preferentially supplied to the grain boundaries and made to segregate there.

By using B precipitates comprised of (Fe, Mn)$_2$B, even in welding methods like spot welding with relatively small amounts of input heat, it is possible to make solute B be sufficiently supplied and/or segregate at the grain boundaries. Therefore, even if in the rapid cooling process after spot welding the heat affected zone thermally contracts and tensile stress is generated in the steel sheet, the solute B segregated along the grain boundaries can reliably keep zinc or other molten metal in the plating layer from penetrating to the inside of the steel sheet and accordingly it becomes possible to sufficiently or reliably suppress LME cracking in the heated affected zone in the steel sheet. The (Fe, Mn)$_2$B precipitates need only be present in an amount sufficient for preventing the penetration of zinc and other molten metal from the steel sheet surface, so they do not have to be present in the steel sheet as a whole. As explained above, it is sufficient that they be present in the surface layer region from the surface of the steel sheet down to a depth of 100 μm in the sheet thickness direction in a 1/500 μm$^2$ or more number density.

If the circle equivalent diameter of the (Fe, Mn)$_2$B precipitates is less than 50 nm or if the number density of the (Fe, Mn)$_2$B precipitates at the surface layer region is less than 1/500 μm$^2$, the effect due to making the (Fe, Mn)$_2$B precipitates present or disperse at the surface layer region, i.e., the pinning of the grain boundaries by the (Fe, Mn)$_2$B precipitates and in turn the segregation of the solute B at the grain boundaries sometimes cannot be sufficiently achieved. On the other hand, if the circle equivalent diameter of the (Fe, Mn)$_2$B precipitates becomes excessively large at more than 300 nm, sometimes adjacent (Fe, Mn)$_2$B precipitates will be joined. If (Fe, Mn)$_2$B precipitates are joined, the number of (Fe, Mn)$_2$B precipitates present or dispersed at the surface layer region of the steel sheet will decrease. In such a case, it is no longer possible to control the number density of the (Fe, Mn)$_2$B precipitates at the surface layer region to within a suitable range, i.e., it is no longer possible to make the (Fe, Mn)$_2$B precipitates present or dispersed at the surface layer region in a 1/500 μm$^2$ or more number density. As a result, similarly, sometimes the effect due to making the (Fe, Mn)$_2$B precipitates present or dispersed at the surface layer region can no longer be sufficiently exhibited. The surface layer region of the steel sheet need only include (Fe, Mn)$_2$B precipitates having a circle equivalent diameter of 50 to 300 nm in a 1/500 μm$^2$ or more number density. Therefore, it may also include (Fe, Mn)$_2$B precipitates having a circle equivalent diameter of less than 50 nm or more than 300 nm.

(Fe, Mn)$_2$B precipitates having a circle equivalent diameter of 50 to 300 nm may be present or dispersed at the surface layer region of the steel sheet in, for example, a 3/500 μm$^2$ or more, 5/500 μm$^2$ or more, 12/500 μm$^2$ or more, 25/500 μm$^2$ or more, or 50/500 μm$^2$ or more number density, preferably present or dispersed in a 5/500 μm$^2$ or more number density. The upper limit value of the number density of the (Fe, Mn)$_2$B precipitates is not particularly prescribed, but if that number density becomes too large, in the same way as the circle equivalent diameter, sometimes the adjacent (Fe, Mn)$_2$B precipitates will join together. Therefore, this is not preferable. Further, if the number density of the (Fe, Mn)$_2$B precipitates becomes too large, sometimes the ductility of the obtained steel sheet will fall. Therefore, from the viewpoint of better improving the ductility of the steel sheet, the upper limit value of the number density of (Fe, Mn)$_2$B precipitates having a circle equivalent diameter of 50 to 300 nm is preferably 500/500 μm$^2$ or less, more preferably 400/500 μm$^2$ or less, still more preferably 250/500 μm$^2$ or less.

In the present invention, "the circle equivalent diameter of the (Fe, Mn)$_2$B precipitates" and "the number density of the (Fe, Mn)$_2$B precipitates" are determined in the following way. First, an extraction replica sample is fabricated by the procedure described in the following I to IV, next that extraction replica sample is examined in the order described in the following (1) to (3) by observation by a TEM (transmission electron microscope) and analysis by a TEM-EDS (transmission electron microscope with energy dispersive X-ray spectroscope) to identify the B precipitates comprised of (Fe, Mn)$_2$B and measure their circle equivalent diameter and number density. In acquiring the TEM image, five fields worth of connected images of 10 μm×10 regions are acquired by at least 30,000× power. The number of (Fe, Mn)$_2$B precipitates having a circle equivalent diameter of 50 to 300 nm in the total 500 μm$^2$ is measured and the obtained total number of (Fe, Mn)$_2$B precipitates is made the number density (unit: /500 μm$^2$). For the circle equivalent diameters, the obtained structural observation image is analyzed to find the areas of the individual (Fe, Mn)$_2$B precipitates and calculate the circle equivalent diameters.

<Method of Preparing Sample>

I. The surface of the test piece is polished to a mirror finish by emery paper and diamond paste.

II. The polished surface is finished by an alumina abrasive.

III. The mirror surface part is etched by the SPEED method (selective potentiostatic etching by electrolytic dissolution) (for washing sample, Asahiklin used).

IV. A carbon extraction replica sample is prepared from a designated location (for mesh, Cu used)

<SPEED Method and Electrolytic Polishing Conditions>

Electrolytic polishing solution: 10% acetylacetone-1% tetramethyl ammonium chloride-methanol Electrolytic polishing conditions: −100 mV VS SCE/10 coulomb/cm$^2$ <TEM Observation Method>

(1) Electron microscope: 200 kV-field emission type transmission electron microscope JEM-2100F (made by JEOL Ltd.)

Acceleration voltage at time of observation: 200 kV (2) Analysis: EDS analysis station JED-2300T (made by JEOL Ltd.)

Acceleration voltage at time of analysis: 200 kV

EDS analysis values for analysis of constituents of B precipitates acquired by probe size=1 nm.

(3) Electron diffraction: nanobeam diffraction (NBD)

Electron beam diffraction image for investigation of structure of precipitates acquired by probe size=3 nm.

[Ferrite: 5.0 to 40.0%]

Ferrite is excellent in ductility, but is a soft structure. To improve the elongation of the steel sheet, it is included in accordance with the strength or ductility demanded. From the viewpoint of improving the ductility of the steel sheet, the ferrite content is, by area ratio, 5.0% or more. It may also be 8.0% or more, 10.0% or more, 12.0% or more, or 15.0% or more. On the other hand, if excessively containing ferrite, sometimes it becomes difficult to secure the desired steel sheet strength. Therefore, the ferrite content is, by area ratio, 40.0% or less. It may also be 38.0% or less, 35.0% or less, 30.0% or less, or 25.0% or less.

[Total of Martensite and Tempered Martensite: 10.0 to 60.0%]

Martensite and tempered martensite are important structures in securing the desired steel sheet strength etc. From such a viewpoint, the total content of martensite and tempered martensite is, by area ratio, 10.0% or more. It may also be 12.0% or more, 15.0% or more, 20.0% or more, or 25.0% or more. On the other hand, if excessively including martensite and tempered martensite, the ductility of the steel sheet falls. Therefore, the total content of martensite and tempered martensite is, by area ratio, 60.0% or less. It may also be 58.0% or less, 55.0% or less, 50.0% or less, or 45.0% or less.

[Bainite: 5.0 to 40.0%]

Bainite is an effective structure for securing the ductility and strength of steel sheet. From the viewpoint of improvement of the ductility, the bainite content is, by area ratio, 5.0% or more. It may also be 8.0% or more, 10.0% or more, or 15.0% or more. On the other hand, if excessively including bainite, the strength of the steel sheet falls. Therefore, the bainite content is, by area ratio, 40.0% or less. It may also be 35.0% or less, 30.0% or less, or 25.0% or less.

[Retained Austenite: 5.0 to 25.0%]

Retained austenite improves the ductility of steel sheet by the TRIP effect of transformation to martensite by work induced transformation during deformation of steel sheet. Therefore, from the viewpoint of improvement of the ductility of steel sheet, the retained austenite content is, by area ratio, 5.0% or more. It may also be 8.0% or more or 10.0% or more. On the other hand, if excessively containing retained austenite, the retained austenite excessively stabilizes and the austenite region broadens after welding, so sometimes the LME resistance of the steel sheet is made to fall. Therefore, the retained austenite content is, by area ratio, 25.0% or less. It may also be 22.0% or less or 20.0% or less. It is generally known that TRIP steel sheet utilizing the transformation-induced plasticity of retained austenite, as explained above, is susceptible to LME at the time of spot welding. However, in the steel sheet according to an embodiment of the present invention, by including B precipitates comprised of $(Fe, Mn)_2B$ at the surface layer region in a predetermined amount, it is also possible to preferentially supply the solute B along the grain boundaries and make it segregate there even in a welding method like spot welding where the amount of input heat is relatively small, so it is possible to remarkably improve the LME resistance of the steel sheet.

The balance structures other than the above structures may be 0%, but if there are balance structures, the balance structures are comprised of, by area ratio, 10.0% or less of pearlite. If the pearlite content is more than 10.0%, sometimes the strength and/or the ductility of the steel sheet falls. Therefore, the pearlite content may be, by area ratio 8.0% or less, 5.0% or less, or 3.0% or less.

[Identification of Structures and Calculation of Area Ratios]

In the present invention, the ferrite, martensite, tempered martensite, bainite, retained austenite, and pearlite are identified and calculated for area ratio by EBSD (electron back scattered diffraction), X-ray diffraction, and SEM (scan electron microscope) observation after corrosion using a Nital reagent or Le Pera solution. A cross-section of the steel sheet in the rolling direction or a cross-section in a direction perpendicular to the rolling direction is examined for structures and measured at a 1000 to 50000× power.

Specifically, the area ratio of the ferrite is measured by the following method. First, the EBSD attached to the SEM is used to measure a range of ⅛ to ⅜ thickness centered about a position of ¼ of the sheet thickness from the surface of the steel sheet at pitches of 0.2 μm. From the measurement data, the value of the grain average misorientation (GAM) is calculated. Further, regions with GAM values of less than 0.5° are deemed ferrite and are measured for area ratio. Here, the "grain average misorientation" is the value obtained by calculating the misorientation between adjacent measurement points in regions surrounded by grain boundaries with misorientations of 5° or more and averaging these for all of the measurement points in the grains.

The area ratio of martensite is calculated by etching a cross-section of the steel sheet in the sheet thickness direction by a Le Pera solution, examining a range of ⅛ to ⅜ thickness centered about a position of ¼ sheet thickness from the surface by FE-SEM, and subtracting from the area ratio of the regions with relatively smaller degrees of corrosion compared with other structures the area ratio of retained austenite measured by the later explained X-ray diffraction.

The tempered martensite and bainite are identified by corroding a cross-section in the sheet thickness direction by a Nital reagent, observing the range of ⅛ to ⅜ thickness centered at the position of ¼ sheet thickness from the surface of the steel sheet by FE-SEM, and observing the positions of cementite contained inside the structures and the variants. Specifically, tempered martensite has cementite formed inside the martensite laths, but there are two or more types of crystal orientation relationships between the martensite laths and cementite, so the cementite formed has several variants. On the other hand, upper bainite has cementite or retained austenite formed at the interfaces of the lath-like bainitic ferrite. Further, lower bainite has cementite formed at the insides of the lath-like bainitic ferrite. There is one type of crystal orientation relationship between the bainitic ferrite and cementite, so the cementite formed has the same variant. By detecting these features of cementite, the tempered martensite and bainite (upper bainite and lower bainite) are identified and the area ratios calculated.

The area ratio of the retained austenite is calculated by X-ray diffraction. First, the sheet surface of the sample is removed down to a position of ¼ of the depth in the sheet thickness direction by mechanical polishing and chemical polishing. Next, the polished sample is calculated for the fraction of retained austenite structures from the integrated intensity ratio of the diffraction peaks of (200) and (211) of the bcc phases and (200), (220), and (311) of the fcc phases obtained using MoKα rays as the characteristic X-rays. This is made the area ratio of the retained austenite.

The pearlite can be identified by corrosion by a Nital reagent and observing the range of ⅛ to ⅜ thickness centered at the position of ¼ sheet thickness from the surface of the steel sheet using a secondary electron image obtained by SEM. Regions captured by a bright contrast in the secondary electron image are deemed pearlite. The area ratio of the same is calculated.

[Plating Layer]

The steel sheet according to an embodiment of the present invention may have a plating layer containing zinc (below, also referred to as a "zinc-containing plating layer") on at least one surface, preferably on both surfaces. The plating layer may be a zinc-containing plating layer having any composition known to persons skilled in the art and may including aluminum, magnesium, or other added elements in addition to zinc. Further, this zinc-containing plating layer may be alloyed or may not be alloyed. Further, the amount of deposition of the zinc-containing plating layer is not particularly limited and may be a general amount of deposition.

If the steel sheet has a zinc-containing plating layer, only naturally, at the time of welding, molten zinc will sometimes enter the base metal steel sheet from that zinc-containing plating layer and cause LME cracking inside the steel sheet. Further, even with steel sheet which has not been plated, for example, when welding it with galvanized steel sheet, sometimes the zinc melted at that galvanized steel sheet will penetrate the steel sheet which has not been plated resulting in LME cracking occurring. However, according to the steel sheet according to an embodiment of the present invention, due to that steel sheet containing B precipitates comprised of $(Fe, Mn)_2B$ in a predetermined amount, even with a welding method like spot welding where the amount of input heat is relatively small, it is possible to make solute B be sufficiently supplied to and/or segregate at the grain boundaries and as a result it is possible to remarkably improve the LME resistance of the steel sheet.

[Mechanical Properties]

According to the steel sheet according to an embodiment of the present invention, it is possible to keep LME cracking from occurring while achieving a high (ultimate) tensile strength, specifically a 700 MPa or more (ultimate) tensile strength. For example, by making the tensile strength 700 MPa or more, it is possible to satisfy the demand for lighter weight of vehicle bodies in automobiles. The tensile strength is preferably 800 MPa or more, more preferably 900 MPa or more. The upper limit value of the tensile strength is not particularly limited, but in general is 2000 MPa or less and may also be 1800 MPa or less. Furthermore, according to the steel sheet according to an embodiment of the present invention, it is possible to achieve excellent ductility. More specifically, it is possible to achieve a ductility giving a breaking elongation of 3.0% or more, preferably 5.0% or more, more preferably 10.0% or more. By the steel sheet having a breaking elongation of 3.0% or more, for example, even if holding down the steel sheet by electrodes at the time of welding, the steel sheet will not crack and suitably welding will be possible.

<Method for Producing Steel Sheet>

Next, the method for producing the steel sheet according to an embodiment of the present invention will be explained. The following explanation is intended to illustrate a characteristic method for producing the steel sheet according to an embodiment of the present invention and is not intended to limit that steel sheet to one produced by the method for production such as explained below.

The method for producing the steel sheet according to an embodiment of the present invention comprises continuously casting a molten steel having the same chemical composition as the chemical composition explained above in relation to the steel sheet to form a steel slab, wherein the continuously casting includes introducing more than 10 ppm and less than 100 ppm of oxygen into the surface layer of the steel slab, hot rolling including finish rolling the steel slab, wherein a completion temperature of the finish rolling is 650 to 950° C., coiling the obtained hot rolled steel sheet at a coiling temperature of 400 to 700° C., and cold rolling the hot rolled steel sheet, then annealing it. Below, each step will be explained in detail.

[Casting Step]

In the method for producing steel sheet according to an embodiment of the present invention, first, molten steel having the same chemical composition as the chemical composition explained above in relation to the steel sheet is continuously cast to form a steel slab. More than 10 ppm and less than 100 ppm of oxygen is introduced into the surface layer of the steel slab formed at the time of that continuous casting. Oxygen can be introduced in such a way by any preferred method known to persons skilled in the art. That introduction of oxygen is not particularly limited, but, for example, may be performed by introducing a powder comprised of iron oxides and other oxides to the vicinity of the molten steel surface layer (i.e., the vicinity of the casting mold walls at the long sides) at the time of the continuous casting or similarly may be performed by introducing iron wires in the vicinity of the molten steel surface layer at the time of continuous casting. Iron wires are oxidized on their surfaces, so by using them, oxygen is easily taken in at the molten steel surface layer at the time of continuous casting. Furthermore, by suitably selecting the size, number, etc., of the iron wires introduced, it is possible to relatively easily control the amount of oxygen introduced to the surface layer of the steel slab formed to a range of more than 10 ppm and less than 100 ppm.

In the above way, by introducing more than 10 ppm and less than 100 ppm of oxygen into the surface layer of the steel slab formed at the time of continuous casting and making it concentrate there, it is possible to make iron oxides form in the surface layer of the steel slab obtained after solidification. Iron oxides function as sites for formation of titanium nitrides, so by making iron oxides form at the surface layer of the steel slab, solute nitrogen in the steel is consumed by the formation of titanium nitrides. By the solute nitrogen in the steel being consumed by formation of titanium nitrides, B in the steel bonding with the solute nitrogen to form boron nitrides (BN) during the later annealing step is obstructed and therefore formation of $(Fe, Mn)_2B$ at the surface layer region of the steel sheet can be promoted. As a result, in the finally obtained steel sheet, improved LME resistance, in particular improved LME resistance even in welding methods like spot welding, can be realized.

However, if the amount of oxygen introduced to the surface layer of the steel slab is too little, sometimes formation of boron nitrides cannot be sufficiently obstructed. In such a case, $(Fe, Mn)_2B$ precipitates cannot sufficiently be made to form in the surface layer region of the finally obtained steel sheet, so improved LME resistance cannot be realized. On the other hand, if the amount of oxygen introduced to the surface layer of the steel slab is too great, the steel slab is liable to crack after the continuous casting. Therefore, the amount of oxygen introduced to the surface layer of the steel slab is more than 10 ppm and less than 100 ppm, preferably 20 ppm or more or 30 ppm or more and/or 90 ppm or less or 70 ppm or less.

The oxygen concentration of the steel slab surface layer is measured by the following procedure. First, after casting, the steel slab is cooled down to room temperature. It is then cut. A block shaped piece with lengths in the casting direction and the direction perpendicular to the casting direction of respectively 5 mm and with a length from the surface of the steel slab in the thickness direction of 25 mm is cut out. The surface of the cut out piece has oxide scale deposited on it, so the oxide scale is removed by shot blasting, then the concentration of oxygen is measured based on JIS G 1239 enacted in 2014 (Iron and steel—Determination of oxygen—Infrared absorption method after fusion under inert gas).

In the above method for production, oxygen is introduced into the surface layer of the cast slab in the casting step, but instead of this, for example, oxygen may also be introduced into the surface layer of the cast slab by adjusting the heating rate and atmosphere when reheating for hot rolling the cast slab after casting. More specifically, by relatively slowly heating the cast slab after casting and lowering the oxygen concentration in the atmosphere around the cast slab, it is possible to keep the oxide scale present on the cast slab from further growing due to the outward diffusion of Fe ions from inside the steel while making the oxygen in that oxide scale diffuse into the steel by inward diffusion. As a result, oxygen can be introduced into the surface layer of the cast slab and iron oxides can be formed in that surface layer.

[Hot Rolling Step]

In the present method, the cast steel slab is next supplied to the hot rolling step. The hot rolling step can be performed by hot rolling the cast steel slab directly or after cooling it once, then reheating it. If reheating it, the heating temperature of the steel slab is generally 1100° C. or more. No upper limit value is particularly prescribed, but for example it may be 1250° C. or less.

[Rough Rolling]

In the present method, for example, the cast steel slab may be adjusted in sheet thickness etc., by the option of rough rolling before the finish rolling. Such rough rolling is not particularly limited in conditions so long as the desired sheet bar dimensions can be secured.

[Finish Rolling]

The obtained steel slab or the steel slab rough rolled in accordance with need in addition to this is next finish rolled. The completion temperature in the finish rolling is controlled to a range of 650 to 950° C. If the completion temperature of the finish rolling is more than 950° C., the ferrite content in the steel sheet becomes higher and sometimes sufficient strength cannot be obtained. Therefore, the completion temperature of the finishing temperature is 950° C. or less, preferably 920° C. or less or 900° C. or less. On the other hand, if the completion temperature of the finish rolling is less than 650° C., cracks will form in the steel surface and similarly formation of cracks at the time of welding will be promoted. Therefore, the completion temperature of the finishing temperature is 650° C. or more, preferably 680° C. or more or 700° C. or more.

[Coiling Step]

After the hot rolling step, the obtained hot rolled steel sheet is coiled at the next coiling step at a coiling temperature of 400 to 700° C. By controlling the coiling temperature to 400 to 700° C., it is possible to reliably make $(Fe, Mn)_2B$ precipitates form at the surface layer region of the finally obtained steel sheet, and as a result improved LME resistance, in particular improved LME resistance even in spot welding and other welding methods, can be achieved. If the coiling temperature is too high, the ferrite grain size in the hot rolled steel sheet will become larger and sufficient strength sometimes will not be able to be obtained after annealing the cold rolled sheet. Therefore, the coiling temperature is 700° C. or less, preferably 680° C. or less or 650° C. or less. On the other hand, if the coiling temperature is too low, the hot rolled steel sheet becomes hard and brittle, so in the later steps, cracks will easily form in the steel sheet surface and the ductility after cold rolling and annealing will fall. Therefore, the coiling temperature is 400° C. or more, preferably 420° C. or more or 450° C. or more. Further, if not performing an operation making titanium nitrides precipitate on the oxides in advance, it is not possible to make $(Fe, Mn)_2B$ precipitates form after coiling just by controlling the coiling temperature.

[Cold Rolling and Annealing Steps]

Finally, the obtained hot rolled steel sheet is pickled etc., as needed, then cold rolled and annealed whereby steel sheet according to an embodiment of the present invention is obtained. The cold rolling and annealing are not particularly limited and can be performed under any suitable conditions. According to the present method, at the time of the annealing step, the solute nitrogen in the steel is sufficiently decreased, so B will not bond with that solute nitrogen to form boron nitrides (BN) and $(Fe, Mn)_2B$ precipitates can be reliably formed at the surface layer region of the steel sheet.

[Plating]

In the present method, at least one surface, preferably both surfaces, of the steel sheet may be formed with a plating layer. Such a plating layer can be formed by any method known to persons skilled in the art. It is not particularly limited, but, for example, may be formed by dipping the above cold rolled steel sheet in a plating bath containing zinc, then annealing it.

Below, preferred embodiments of cold rolling, annealing, and plating treatment will be explained in detail. The following description is just an illustration of the preferred embodiments of cold rolling, annealing, and plating treatment and does not limit the method for producing steel sheet in any way.

(Pickling)

First, before cold rolling, the coiled hot rolled steel sheet is uncoiled and supplied to the pickling. By performing pickling, the oxide scale on the surface of the hot rolled steel sheet is removed and the chemical convertibility and plateability of the cold rolled steel sheet can be improved. The pickling may be performed all at once or divided into several operations.

(Cold Rolling Reduction)

The cold rolling reduction has an effect on the recrystallization behavior of the ferrite at the time of cold rolling and annealing. If less than 10.0%, the degree of integration of orientation of the ferrite falls and the ductility sometimes deteriorates. For this reason, the lower limit value is preferably 10.0% or more, more preferably 15.0% or more. Further, if more than 90.0%, the ferrite easily recrystallizes, but the austenite made to form at the hot rolled sheet changes due to work induced transformation and the degree of integration of orientation of the martensite and tempered martensite rises, so the ductility sometimes deteriorates. For this reason, the upper limit value is preferably 90.0% or less, more preferably 85.0% or less.

(Annealing of Cold Rolled Sheet)

(Heating Rate)

The heating rate in the case where cold rolled steel sheet is run through a continuous annealing line or plating line is not particularly restricted, but with a less than 0.5° C./s heating rate, the productivity will sometimes be greatly impaired. In addition, if the heating rate is slow, the circle equivalent diameter of the $(Fe, Mn)_2B$ precipitates formed at the surface layer region of the steel sheet will tend to become larger. For example, $(Fe, Mn)_2B$ precipitates having a circle equivalent diameter of more than 300 nm will tend to relatively greatly form. For this reason, the heating rate is preferably 0.5° C./s or more. On the other hand, if making the heating rate more than 100° C./s, excessive capital investment will be invited. Furthermore, the circle equivalent diameter of the $(Fe, Mn)_2B$ precipitates will tend to become smaller. For example, $(Fe, Mn)_2B$ precipitates having a circle equivalent diameter of less than 50 nm will tend to relatively greatly form. For this reason, the heating rate is preferably 100° C./s or less.

(Annealing Temperature)

The annealing temperature is a factor affecting the recrystallization behavior of ferrite. Further, it affects the behavior in formation of austenite and is also an extremely important factor in control of the strength-ductility balance of the steel. If less than 700° C., the amount of formation of austenite is small and further nonrecrystallized ferrite remains, so sometimes the ductility deteriorates. For this reason, the lower limit value is preferably 700° C. or more, more preferably 750° C. or more. Further, if more than 900° C., the amount of austenite formed while holding the sheet at a constant temperature in the annealing increases, so in the structure after cold rolling and annealing, the degree of integration of orientation of ferrite and bainite falls and the ductility sometimes deteriorates. For this reason, the upper limit value is preferably 900° C. or less, more preferably 850° C. or less. Further, there is no need for treatment raising the dew point of the annealing atmosphere to form internal oxides. Even if an internal oxide layer is formed at the time of annealing, the previously formed $(Fe, Mn)_2B$ precipitates are maintained.

(Hold Time)

The steel sheet is supplied to the continuous annealing line where it is heated to the annealing temperature to anneal it. At that time, the hold time is preferably 10 to 600 seconds. If the hold time is less than 10 seconds, the fraction of austenite at the annealing temperature becomes insufficient or carbides which had been present before the annealing insufficiently dissolve and the predetermined structure and properties are liable to be unable to be obtained. Even if the hold time becomes more than 600 seconds, while there is no problem in terms of the properties, the line length of the facility becomes longer, so 600 seconds or so becomes the de facto upper limit.

(Average Cooling Rate)

In the cooling after the above annealing, the steel sheet is preferably cooled from 750° C. to 550° C. by an average cooling rate of 100.0° C./s or less. The lower limit value of the average cooling rate is not particularly limited, but for example may be 2.5° C./s. The reason for making the lower limit value of the average cooling rate 2.5° C./s is to keep ferrite transformation from occurring at the base metal steel sheet and the base metal steel sheet from softening. If the average cooling rate is slower than 2.5° C./s, the strength will sometimes fall. It is more preferably 5.0° C./s or more, still more preferably 10.0° C./s or more, still more preferably 20.0° C./s or more. If more than 750° C., ferrite transformation will hardly occur, so the cooling rate is not limited. At a less than 550° C. temperature, low temperature transformed structures are obtained, so the cooling rate is not limited. If cooling by a rate faster than 100.0° C./s, low temperature transformed structures form at the surface layer as well and cause variation in hardness, so the cooling is preferably performed at 100.0° C./s or less. More preferably it is performed at 80.0° C./s or less. Still more preferably it is performed at 60.0° C./s or less.

(Cooling Stop Temperature)

The above cooling is stopped at 25° C. to 550° C. in temperature (cooling stop temperature). After that, if the cooling stop temperature is less than the plating bath temperature-40° C., the steel sheet may be reheated to 350° C. to 550° C. in temperature region and made to dwell there. If cooling in the above temperature range, during the cooling, martensite is formed from the nontransformed austenite. After that, by reheating, the martensite is tempered, carbides precipitate in the hard phases and dislocations recover and are rearranged, and the hydrogen embrittlement resistance is improved. The lower limit of the cooling stop temperature is made 25° C. not only because excessive cooling requires massive capital investment, but also because the effect becomes saturated.

(Dwell Temperature)

After the reheating and before dipping in the plating bath, the steel sheet may be made to dwell for a while in the 350 to 550° C. temperature region. Dwelling at this temperature region not only contributes to tempering of the martensite, but also eliminates unevenness of temperature in the width direction of the sheet and improves the appearance after plating. If the cooling stop temperature was 350° C. to 550° C., the steel sheet may be made to dwell without reheating.

(Dwell Time)

For obtaining this effect, the dwell time is preferably 10 seconds or more and 600 seconds or less.

(Tempering)

In a series of annealing steps, the cold rolled sheet or the steel sheet obtained by plating the cold rolled sheet may be cooled down to room temperature or cooled halfway down to room temperature (however, martensite transformation start temperature (Ms) or less), then started to be reheated and held at the 150° C. or more and 400° C. or less temperature region for 2 seconds or more. According to this step, the martensite formed during the cooling after the reheating is tempered and rendered tempered martensite. By this, it is possible to improve the hydrogen embrittlement resistance. If performing the tempering step, if the hold temperature is less than 150° C. or the hold time is less than 2 seconds, the martensite will not be sufficiently tempered and satisfactory changes will sometimes not be able to be made in the microstructure and mechanical properties. On the other hand, if the hold temperature becomes more than 400° C., the dislocation density in the tempered martensite falls and sometimes a drop in tensile strength is invited. For this reason, when performing tempering, the steel sheet is preferably held in the 150° C. or more and 400° C. or less temperature region for 2 seconds or more. The tempering may also be performed in a continuous annealing facility or may be performed at a separate facility off line after the continuous annealing. At that time, the tempering time differs depending on the tempering temperature. That is, the lower the temperature, the longer the time, while the higher the temperature the shorter the time.

(Plating)

The cold rolled steel sheet in the annealing step or after the annealing step may in accordance with need be heated or cooled to (zinc plating bath temperature-40)° C. to (zinc plating bath temperature+50)° C. and hot dip galvanized. Due to the hot dip galvanization step, at least one surface, preferably both surfaces, of the cold rolled steel sheet is formed with a hot dip galvanized layer. In this case, the corrosion resistance of the cold rolled steel sheet is improved, so this is preferable. Even if performing hot dip galvanization, the hydrogen embrittlement resistance of the cold rolled steel sheet can be sufficiently maintained.

The plating treatment includes the Sendzimir method of "degreasing and pickling, then heating in a nonoxidizing atmosphere, annealing in a reducing atmosphere containing $H_2$ and $N_2$, then cooling down to near the plating bath temperature and dipping in the plating bath", the total reduction furnace method of "adjusting the atmosphere at the time of annealing, first making the steel sheet surface oxidize, then performing reduction so as to clean the surface before plating, then dipping in the plating bath", the flux method of "degreasing and pickling the steel sheet, then using ammonium chloride etc., for flux treatment and dipping in the plating bath", etc., but whichever the conditions under which the treatment is performed, the effect of the present invention can be exhibited. Further, Ni plating before this plating is unnecessary in the present invention. The steel sheet is directly galvanized. However, Ni plating itself has no effect on formation and maintenance of (Fe, Mn)$_2$B precipitates so Ni plating itself may be provided.
(Temperature of Plating Bath)

The plating bath temperature is preferably 450 to 490° C. If the plating bath temperature is less than 450° C., the viscosity of the plating bath will excessively rise, control of the thickness of the plating layer will become difficult, and the appearance of the hot dip galvanized steel sheet is liable to be impaired. On the other hand, if the plating bath temperature is more than 490° C., a large amount of fumes will be generated and a safe plating operation is liable to become difficult. The plating bath temperature is more preferably 455° C. or more and more preferably 480° C. or less.

(Composition of Plating Bath)

The composition of the plating bath is preferably mainly Zn with an effective amount of Al (value of total amount of Al in plating bath minus total amount of Fe) of 0.050 to 0.250 mass %. If the effective amount of Al in the plating bath is less than 0.050 mass %, Fe excessively penetrates the plating layer and the plating adhesion is liable to fall. On the other hand, if the effective amount of Al in the plating bath is more than 0.250 mass %, Al-based oxides which obstruct movement of Fe atoms and Zn atoms are formed at the interface of the steel sheet and plating layer and the plating adhesion is liable to fall. The effective amount of Al in the plating bath is more preferably 0.065 mass % or more and still more preferably 0.180 mass % or less.

(Steel Sheet Temperature When Entering Plating Bath)

The sheet temperature when dipped into the plating bath (temperature of steel sheet when dipped into hot dip galvanization bath) is preferably a temperature range from a temperature 40° C. lower than the hot dip galvanization bath temperature (hot dip galvanization bath temperature-40° C.) to a temperature 50° C. higher than the hot dip galvanization bath (hot dip galvanization bath temperature+50° C.). If the sheet temperature when dipped into the plating bath is below the hot dip galvanization bath temperature-40° C., the heat removal when dipped into the plating bath will be great and part of the molten zinc will solidify sometimes degrading the plating appearance, so this is not preferable. If the sheet temperature before dipping is below the hot dip galvanization bath temperature-40° C., any method may be used to further heat the sheet before dipping it into the plating bath so as to control the sheet temperature to the hot dip galvanization bath temperature-40° C. or more and then dip the sheet in the plating bath. Further, if the sheet temperature when dipped into the plating bath is more than the hot dip galvanization bath temperature+50° C., problems in operation are caused along with the rise in the plating bath temperature.

(Plating Pretreatment)

To further improve the plating adhesion, before annealing on the continuous hot dip galvanization line, the base metal steel sheet may be formed with a plating comprised of one or more of Ni, Cu, Co, and Fe.

(Plating Post Treatment)

The surface of the hot dip galvanized steel sheet and hot dip galvannealed steel sheet can, for the purpose of improvement of the coatability and weldability, be provided with an upper layer plating or be treated in various ways, for example, chromate treatment, phosphate treatment, treatment for improving lubrication, treatment for improving weldability, etc.

(Skin Pass Rolling)

Furthermore, skin pass rolling may be performed to correct the shape of the steel sheet and improve the ductility by introducing movable dislocations. The rolling reduction of the skin pass rolling after heat treatment is preferably 0.1 to 1.5%. If less than 0.1%, the effect is small and control is also difficult, so 0.1% is the lower limit. If more than 1.5%, the productivity remarkably falls, so 1.5% is the upper limit. The skin pass may be performed in line or may be performed off line. Further, it is possible to perform the skin pass to the target rolling reduction all at one or perform it divided into several operations.

Below, examples will be used to explain the present invention in more detail, but the present invention is not limited to these examples in any way.

EXAMPLES

Examples 1

Steels having the chemical compositions shown in Table 1 were melted. At the time of casting them into steel slabs, iron wires were added and melted on the steel slab surface layers to produce the steel slabs. These steel slabs were loaded into a furnace heated to 1220° C. and held there for 60 minutes for homogenization, then were taken out into the atmosphere and hot rolled to obtain sheet thickness 2.8 mm steel sheets. The completion temperature of the finish rolling in the hot rolling was 920° C. After the completion of the finish rolling, after the elapse of 1.5 seconds, water cooling was used to cool the sheets. They were cooled by a 28° C./s rate down to 550° C. and coiled at 550° C. Next, the oxide scales of the hot rolled steel sheets were removed by pickling and the sheets cold rolled by a rolling reduction of 50% to finish them to sheet thicknesses of 1.4 mm. Further, the cold rolled steel sheets were heated to 850° C. by a 4.5° C./s rate, held at 850° C. for 110 seconds, then cooled by a 40.0° C./s average cooling rate down to 330° C., then held at 380° C. for 200 seconds for annealing the cold rolled sheets. Furthermore, the annealed cold rolled sheets were skin pass rolled by an elongation rate of the steel strips of 0.1%. Table 2 shows the results of evaluation of the properties of the thus worked and heat treated steel sheets. The balances besides the constituents shown in Table 1 are Fe and impurities. Further, the chemical compositions obtained by analyzing samples taken from the produced steel sheets were similar to the chemical compositions of the steels shown in Table 1.

(Evaluation of Tensile Strength and Breaking Elongation)

The tensile strength (MPa) and breaking elongation (%) were evaluated based on JIS Z 2241 (2011) using JIS No. 5 test pieces taken with directions perpendicular to rolling direction of obtained steel sheet (width direction) as their longitudinal directions.

(Evaluation of LME Resistance)

The LME resistance was evaluated in the following way. GA soft steels (hot dip galvannealed steel sheets) and steel sheets shown in Table 2 were subjected to welding tests under the following conditions. Test pieces were prepared by welding while changing the amounts of current from 4.0 kA to 10.0 kA, then the cross-sectional structures were examined to confirm the nugget sizes and lengths of cracks. Cases with crack lengths of less than 0.1 mm in regions of a nugget size of 5.5 mm or less were deemed as passing ("good") and cases with crack lengths of 0.1 mm or more in regions of a nugget size of 5.5 mm or less were deemed as failing ("poor")

Electrodes: DR type electrodes made of Cr—Cu (tip outside diameter: 8 mm, R: 40 mm)
Electrode force P: 450 kg
Tilt angle θ of electrodes: 5°
Upslope: none
First weld time t1: 0.2 second
Nonweld time tc: 0.04 second
Second weld time t2: 0.4 second
Current ratio I1/I2: 0.7
Hold time after end of welding: 0.1 second The case where the LME resistance was evaluated as "good", the tensile strength was 700 MPa or more, and the breaking elongation was 3.0% or more was evaluated as a steel sheet having an improved LME resistance which is high in strength and excellent in ductility.

TABLE 1

| No. | C | Si | Mn | P | S | N | Al | Ti | B | Co | Ni | Mo | Cr | Nb |
|---|---|---|---|---|---|---|---|---|---|---|---|---|---|---|
| A | 0.09 | 1.53 | 2.45 | 0.0158 | 0.0139 | 0.0016 | 0.186 | 0.044 | 0.0018 | | | | | |
| B | 0.11 | 0.88 | 1.90 | 0.0014 | 0.0023 | 0.0016 | 0.127 | 0.063 | 0.0030 | | | | | |
| C | 0.17 | 0.51 | 0.39 | 0.0019 | 0.0084 | 0.0040 | 0.116 | 0.395 | 0.0027 | | | | | |
| D | 0.29 | 0.82 | 2.04 | 0.0025 | 0.0123 | 0.0029 | 0.793 | 0.027 | 0.0018 | | | | | |
| E | 0.27 | 1.87 | 3.59 | 0.0017 | 0.0026 | 0.0010 | 0.061 | 0.046 | 0.0023 | | | | | |
| F | 0.25 | 0.37 | 1.57 | 0.0016 | 0.0019 | 0.0014 | 0.860 | 0.064 | 0.0013 | | | | | |
| G | 0.20 | 0.04 | 3.27 | 0.0011 | 0.0018 | 0.0116 | 0.738 | 0.057 | 0.0017 | | | | | |
| H | 0.08 | 1.17 | 0.72 | 0.0017 | 0.0032 | 0.0022 | 0.091 | 0.023 | 0.0011 | | | | | |
| I | 0.14 | 0.16 | 2.95 | 0.0009 | 0.0016 | 0.0142 | 0.049 | 0.044 | 0.0016 | | | | | |
| J | 0.18 | 0.30 | 0.37 | 0.0076 | 0.0017 | 0.0020 | 0.381 | 0.420 | 0.0013 | | | | | |
| K | 0.16 | 1.83 | 0.91 | 0.0012 | 0.0163 | 0.0015 | 0.155 | 0.051 | 0.0021 | | | | | |
| L | 0.27 | 0.56 | 2.20 | 0.0114 | 0.0029 | 0.0086 | 0.092 | 0.369 | 0.0024 | | | | | |
| M | 0.07 | 1.24 | 0.57 | 0.0023 | 0.0020 | 0.0155 | 0.088 | 0.029 | 0.0013 | 0.09 | | | | |
| N | 0.23 | 1.76 | 3.68 | 0.0173 | 0.0014 | 0.0173 | 0.290 | 0.193 | 0.0015 | | 0.10 | | | 0.027 |
| O | 0.19 | 1.52 | 2.41 | 0.0025 | 0.0012 | 0.0015 | 0.062 | 0.047 | 0.0014 | | 0.06 | | | |
| P | 0.26 | 1.22 | 1.72 | 0.0010 | 0.0058 | 0.0019 | 0.112 | 0.147 | 0.0031 | | | 0.115 | | |
| Q | 0.25 | 0.69 | 3.78 | 0.0032 | 0.0017 | 0.0026 | 0.040 | 0.029 | 0.0013 | 0.27 | 0.11 | | | 0.418 |
| R | 0.06 | 1.68 | 1.32 | 0.0014 | 0.0043 | 0.0018 | 0.080 | 0.042 | 0.0015 | | | | | |
| S | 0.10 | 0.63 | 0.96 | 0.0018 | 0.0011 | 0.0018 | 0.047 | 0.049 | 0.0013 | 0.06 | | 0.19 | 1.682 | |
| T | 0.21 | 1.03 | 1.89 | 0.0056 | 0.0158 | 0.0011 | 0.120 | 0.279 | 0.0013 | | | | | |
| U | 0.12 | 0.94 | 2.61 | 0.0009 | 0.0017 | 0.0018 | 0.069 | 0.028 | 0.0024 | 0.36 | 0.08 | 0.78 | | 0.040 |
| V | 0.13 | 1.48 | 2.65 | 0.0023 | 0.0018 | 0.0020 | 0.088 | 0.069 | 0.0011 | | | | | |
| W | 0.23 | 1.59 | 3.38 | 0.0036 | 0.0018 | 0.0055 | 0.576 | 0.061 | 0.0036 | 0.04 | | | | |
| X | 0.15 | 0.32 | 1.23 | 0.0140 | 0.0012 | 0.0022 | 0.101 | 0.104 | 0.0017 | | 0.09 | | | |
| Y | 0.04 | 1.27 | 0.55 | 0.0023 | 0.0037 | 0.0013 | 0.699 | 0.384 | 0.0017 | | 0.08 | | | |
| Z | 0.31 | 0.07 | 1.61 | 0.0017 | 0.0011 | 0.0016 | 0.083 | 0.099 | 0.0086 | 0.12 | 0.61 | | | |
| AA | 0.21 | 2.04 | 1.90 | 0.0017 | 0.0153 | 0.0014 | 0.280 | 0.035 | 0.0020 | | | 0.127 | | 0.036 |
| AB | 0.13 | 1.09 | 0.02 | 0.0146 | 0.0117 | 0.0160 | 0.069 | 0.027 | 0.0013 | | 0.16 | | | |
| AC | 0.21 | 1.90 | 4.14 | 0.0026 | 0.0011 | 0.0143 | 0.753 | 0.048 | 0.0016 | | 0.11 | | | 0.043 |
| AD | 0.11 | 1.14 | 1.45 | 0.0207 | 0.0012 | 0.0014 | 0.104 | 0.219 | 0.0020 | | 0.14 | | | |
| AE | 0.16 | 1.52 | 2.26 | 0.0024 | 0.0205 | 0.0012 | 0.049 | 0.051 | 0.0034 | | | | | |
| AF | 0.29 | 0.10 | 3.67 | 0.0028 | 0.0020 | 0.0204 | 0.078 | 0.063 | 0.0028 | 0.04 | | 0.208 | | |
| AG | 0.20 | 1.73 | 0.42 | 0.0137 | 0.0020 | 0.0020 | 1.026 | 0.288 | 0.0019 | | 0.06 | | 1.307 | 0.035 |
| AH | 0.09 | 1.04 | 0.90 | 0.0018 | 0.0025 | 0.0023 | 0.504 | 0.518 | 0.0011 | 0.04 | 0.11 | 0.15 | | 0.049 |
| AI | 0.17 | 0.89 | 2.48 | 0.0013 | 0.0013 | 0.0011 | 0.064 | 0.253 | 0.0005 | | 0.09 | 0.170 | | |
| AJ | 0.08 | 1.73 | 2.10 | 0.0016 | 0.0012 | 0.0051 | 0.179 | 0.081 | 0.0103 | | 0.10 | | | |
| AK | 0.15 | 0.41 | 0.65 | 0.0015 | 0.0021 | 0.0009 | 0.062 | 0.056 | 0.0071 | 0.51 | 0.73 | | | 0.020 |
| AL | 0.29 | 0.46 | 3.27 | 0.0014 | 0.0073 | 0.0020 | 0.064 | 0.365 | 0.0014 | | 1.03 | | | |
| AM | 0.08 | 1.80 | 2.19 | 0.0023 | 0.0009 | 0.0018 | 0.294 | 0.034 | 0.0016 | | 0.85 | 1.02 | | 0.102 |
| AN | 0.18 | 1.07 | 0.84 | 0.0012 | 0.0041 | 0.0012 | 0.070 | 0.193 | 0.0013 | | 0.09 | 2.069 | | |
| AP | 0.12 | 1.48 | 0.34 | 0.0162 | 0.0015 | 0.0168 | 0.051 | 0.056 | 0.0013 | 0.06 | 0.71 | 0.55 | | 0.514 |
| AQ | 0.23 | 1.68 | 2.75 | 0.0014 | 0.0020 | 0.0022 | 0.107 | 0.053 | 0.0014 | | | 0.179 | | |
| AR | 0.23 | 1.43 | 3.30 | 0.0009 | 0.0168 | 0.0040 | 0.070 | 0.036 | 0.0039 | 0.03 | 0.09 | | | 0.065 |
| AS | 0.06 | 1.84 | 2.16 | 0.0015 | 0.0162 | 0.0022 | 0.093 | 0.025 | 0.0018 | | 0.77 | 0.37 | 0.199 | |
| AT | 0.25 | 1.32 | 1.29 | 0.0019 | 0.0135 | 0.0077 | 0.163 | 0.078 | 0.0012 | 0.04 | 0.76 | 0.09 | 0.181 | 0.414 |
| AU | 0.20 | 1.57 | 1.87 | 0.0033 | 0.0015 | 0.0028 | 0.221 | 0.060 | 0.0071 | 0.07 | | | 1.615 | 0.073 |
| AV | 0.25 | 1.27 | 0.65 | 0.0106 | 0.0015 | 0.0117 | 0.845 | 0.118 | 0.0016 | | 0.66 | 0.79 | 0.193 | |
| AW | 0.19 | 0.28 | 3.48 | 0.0041 | 0.0010 | 0.0018 | 0.086 | 0.045 | 0.0016 | | | | | 0.249 |
| AX | 0.25 | 1.57 | 3.56 | 0.0038 | 0.0051 | 0.0015 | 0.079 | 0.051 | 0.0012 | | 0.11 | | 0.166 | |

TABLE 1-continued

| No. | | | | | | | | | | | | | | |
|---|---|---|---|---|---|---|---|---|---|---|---|---|---|---|
| AY | 0.21 | 1.72 | 1.73 | 0.0019 | 0.0144 | 0.0014 | 0.082 | 0.052 | 0.0015 | 0.05 | 0.08 | | 0.566 | |
| AZ | 0.27 | 0.76 | 0.50 | 0.0015 | 0.0020 | 0.0037 | 0.839 | 0.160 | 0.0083 | 0.05 | 0.07 | | | |
| BA | 0.16 | 0.93 | 1.65 | 0.0016 | 0.0014 | 0.0022 | 0.105 | 0.071 | 0.0079 | | | | | |
| BB | 0.16 | 0.67 | 1.01 | 0.0013 | 0.0013 | 0.0084 | 0.066 | 0.033 | 0.0047 | 0.23 | | | | |
| BC | 0.07 | 0.47 | 3.78 | 0.0013 | 0.0020 | 0.0022 | 0.157 | 0.035 | 0.0014 | | | | | |

| No. | V | Cu | W | Ta | Sn | Sb | As | Mg | Ca | Y | Zr | La | Ce | Remarks |
|---|---|---|---|---|---|---|---|---|---|---|---|---|---|---|
| A | | | | | | | | | | | | | | Inv. steel |
| B | | | | | | | | | | | | | | Inv. steel |
| C | | | | | | | | | | | | | | Inv. steel |
| D | | | | | | | | | | | | | | Inv. steel |
| E | | | | | | | | | | | | | | Inv. steel |
| F | | | | | | | | | | | | | | Inv. steel |
| G | | | | | | | | | | | | | | Inv. steel |
| H | | | | | | | | | | | | | | Inv. steel |
| I | | | | | | | | | | | | | | Inv. steel |
| J | | | | | | | | | | | | | | Inv. steel |
| K | | | | | | | | | | | | | | Inv. steel |
| L | | | | | | | | | | | | | | Inv. steel |
| M | | 0.051 | | 0.011 | 0.006 | 0.003 | 0.007 | | | | | | | Inv. steel |
| N | | | 0.012 | | 0.018 | | | | 0.005 | 0.007 | 0.009 | | 0.004 | Inv. steel |
| O | 0.048 | | | | | | | | | | | | | Inv. steel |
| P | | | | | | | | | | | | | | Inv. steel |
| Q | 0.140 | | | | | 0.003 | | | | 0.004 | | | | Inv. steel |
| R | | | | | | | | | 0.004 | | | | | Inv. steel |
| S | | | | | | | | | | | | 0.006 | 0.003 | Inv. steel |
| T | 0.028 | | | 0.066 | | | | | | | | | | Inv. steel |
| U | | | | | | | | | 0.006 | 0.007 | 0.006 | | | Inv. steel |
| V | 0.032 | | | | | | | | | | 0.005 | | | Inv. steel |
| W | | 0.084 | | | 0.010 | | 0.007 | | 0.005 | | | 0.010 | | Inv. steel |
| X | | 0.024 | | | | | | | | | 0.006 | | | Inv. steel |
| Y | | | | 0.007 | | | 0.005 | 0.0054 | | 0.004 | 0.005 | | | Comp. steel |
| Z | | 0.056 | 0.012 | 0.011 | | 0.013 | | | 0.032 | | 0.008 | | | Comp. steel |
| AA | | | 0.013 | | | | | 0.020 | | | | | 0.043 | Comp. steel |
| AB | 0.060 | 0.044 | | | 0.034 | | 0.006 | 0.0096 | | | 0.038 | 0.041 | | Comp. steel |
| AC | | | 0.034 | 0.007 | 0.023 | | | 0.0024 | | 0.004 | | 0.004 | 0.020 | Comp. steel |
| AD | | | | | | | | | | | | | | Comp. steel |
| AE | | 0.410 | | 0.015 | 0.008 | | | 0.0026 | 0.006 | | | | 0.033 | Comp. steel |
| AF | | | | 0.084 | | | | | | | | | 0.011 | Comp. steel |
| AG | | 0.033 | | 0.009 | | | | 0.0263 | 0.005 | 0.005 | | 0.005 | | Comp. steel |
| AH | 0.093 | | | | 0.006 | | | | | | 0.007 | | | Comp. steel |
| AI | | | 0.005 | 0.007 | 0.006 | | 0.006 | | | | 0.017 | | 0.022 | Comp. steel |
| AJ | | 0.077 | 0.027 | 0.084 | | 0.006 | 0.004 | | | 0.006 | | | | Comp. steel |
| AK | 0.029 | | | | | | | 0.0050 | 0.005 | | 0.003 | | | Comp. steel |
| AL | 0.062 | | 0.012 | | | 0.009 | | | | 0.018 | 0.005 | | 0.029 | Comp. steel |
| AM | 0.379 | | | | 0.006 | | | | | | 0.010 | 0.023 | | Comp. steel |
| AN | | | 0.014 | | | 0.006 | 0.006 | | | | 0.010 | | | Comp. steel |
| AP | | | | | 0.005 | 0.003 | | | | | 0.004 | 0.004 | | Comp. steel |
| AQ | 0.513 | 0.133 | | | | | | | 0.007 | | | | | Comp. steel |
| AR | | 0.518 | | 0.074 | 0.005 | | | 0.0109 | | | | | | Comp. steel |
| AS | | | 0.047 | 0.104 | 0.009 | 0.041 | | | | | | 0.017 | | Comp. steel |
| AT | 0.129 | | | 0.103 | 0.042 | | | | 0.003 | | | 0.010 | | Comp. steel |
| AU | | 0.059 | | 0.051 | | 0.006 | | | 0.006 | 0.004 | | | 0.012 | Comp. steel |
| AV | | | 0.070 | | 0.052 | 0.006 | | | | | 0.007 | | | Comp. steel |
| AW | | | | | 0.052 | | 0.0062 | | | | | | | Comp. steel |
| AX | | | 0.015 | | 0.0517 | | | | | | 0.034 | 0.006 | | Comp. steel |
| AY | 0.031 | 0.197 | | | | | | 0.051 | | 0.007 | | | | Comp. steel |
| AZ | | 0.049 | | 0.007 | | 0.039 | | | 0.051 | | | | | Comp. steel |
| BA | | 0.026 | | 0.010 | | 0.018 | 0.0369 | | | | 0.051 | 0.006 | | Comp. steel |
| BB | | | | | | 0.027 | 0.0041 | | | | 0.003 | 0.051 | 0.004 | Comp. steel |
| BC | 0.414 | | 0.060 | | 0.013 | 0.007 | | 0.0039 | | | | 0.052 | | Comp. steel |

*Bold underlines indicate outside scope of present invention.

TABLE 2

| No. | Steel slab surface layer oxygen conc. (ppm) | Ferrite (%) | Total of martensite and tempered martensite (%) | Bainite (%) | Retained austenite (%) | Pearlite (%) | Number density (/500 µm²) | Tensile strength (MPa) | Breaking Elongation (%) | LME resistance | Remarks |
|---|---|---|---|---|---|---|---|---|---|---|---|
| A-1 | 77 | 32.5 | 50.6 | 10.0 | 6.9 | 0.0 | 15 | 1010 | 12.8 | Good | Ex. |
| B-1 | 28 | 30.6 | 57.8 | 6.1 | 5.4 | 0.1 | 9 | 959 | 13.6 | Good | Ex. |
| C-1 | 88 | 37.0 | 26.1 | 21.7 | 9.6 | 5.6 | 36 | 738 | 21.5 | Good | Ex. |
| D-1 | 76 | 33.2 | 32.2 | 18.3 | 16.3 | 0.0 | 16 | 1024 | 16.3 | Good | Ex. |
| E-1 | 38 | 5.6 | 47.3 | 34.4 | 12.7 | 0.0 | 41 | 982 | 15.5 | Good | Ex. |
| F-1 | 42 | 38.1 | 43.4 | 13.1 | 5.3 | 0.1 | 21 | 965 | 12.9 | Good | Ex. |
| G-1 | 21 | 18.4 | 26.7 | 39.9 | 15.0 | 0.0 | 100 | 714 | 26.2 | Good | Ex. |
| H-1 | 29 | 37.1 | 37.3 | 17.4 | 6.3 | 1.9 | 10 | 752 | 19.6 | Good | Ex. |
| I-1 | 84 | 5.0 | 58.1 | 25.4 | 11.3 | 0.2 | 15 | 843 | 19.2 | Good | Ex. |
| J-1 | 35 | 34.1 | 29.7 | 25.1 | 8.5 | 2.6 | 28 | 882 | 16.9 | Good | Ex. |
| K-1 | 73 | 38.2 | 45.3 | 7.0 | 9.2 | 0.3 | 25 | 1011 | 13.6 | Good | Ex. |
| L-1 | 23 | 5.8 | 58.8 | 19.6 | 15.8 | 0.0 | 39 | 974 | 17.6 | Good | Ex. |
| M-1 | 13 | 34.7 | 36.5 | 21.2 | 5.4 | 2.2 | 36 | 760 | 19.1 | Good | Ex. |
| N-1 | 70 | 8.3 | 45.1 | 37.2 | 9.4 | 0.0 | 11 | 968 | 15 | Good | Ex. |
| O-1 | 19 | 15.2 | 46.4 | 25.2 | 13.2 | 0.0 | 25 | 939 | 17.3 | Good | Ex. |
| P-1 | 75 | 17.5 | 50.0 | 18.2 | 14.3 | 0.0 | 35 | 983 | 16.9 | Good | Ex. |
| Q-1 | 42 | 5.3 | 51.6 | 36.7 | 6.4 | 0.0 | 8 | 922 | 14.7 | Good | Ex. |
| R-1 | 84 | 36.7 | 47.9 | 8.5 | 6.8 | 0.1 | 2 | 926 | 14.7 | Good | Ex. |
| S-1 | 15 | 21.8 | 58.0 | 14.3 | 5.9 | 0.0 | 30 | 872 | 15.5 | Good | Ex. |
| T-1 | 15 | 14.9 | 58.9 | 19.2 | 6.9 | 0.1 | 20 | 882 | 15.8 | Good | Ex. |
| U-1 | 48 | 15.2 | 58.3 | 20.9 | 5.6 | 0.0 | 4 | 856 | 16 | Good | Ex. |
| V-1 | 29 | 20.9 | 54.7 | 18.2 | 6.2 | 0.0 | 41 | 953 | 13.8 | Good | Ex. |
| W-1 | 58 | 25.7 | 42.8 | 25.6 | 5.9 | 0.0 | 38 | 1105 | 11 | Good | Ex. |
| X-1 | 33 | 36.6 | 48.6 | 8.2 | 5.6 | 1.0 | 17 | 773 | 18.3 | Good | Ex. |
| Y-1 | 53 | 34.8 | 33.3 | 25.2 | 5.2 | 1.5 | 26 | 684 | 22 | Good | Comp. ex. |
| Z-1 | 73 | 10.0 | 59.3 | 19.9 | 10.7 | 0.1 | 474 | 1196 | 11.8 | Poor | Comp. ex. |
| AA-1 | 30 | 35.2 | 15.7 | 22.7 | 26.4 | 0.0 | 52 | 890 | 24.5 | Poor | Comp. ex. |
| AB-1 | 47 | 37.4 | 20.4 | 28.2 | 5.5 | 8.5 | 0 | 716 | 20.6 | Poor | Comp. ex. |
| AC-1 | 88 | 35.8 | 21.7 | 34.6 | 7.9 | 0.0 | 13 | 928 | 15.1 | Poor | Comp. ex. |
| AD-1 | 28 | 34.2 | 52.3 | 7.1 | 6.3 | 0.1 | 32 | 957 | 14.1 | Poor | Comp. ex. |
| AE-1 | 35 | 21.1 | 55.2 | 15.6 | 8.1 | 0.0 | 125 | 949 | 15 | Poor | Comp. ex. |
| AF-1 | 11 | 17.2 | 59.3 | 15.8 | 7.7 | 0.0 | 0 | 940 | 15.1 | Poor | Comp. ex. |
| AG-1 | 12 | 41.8 | 35.2 | 15.7 | 7.3 | 0.0 | 141 | 664 | 24.5 | Good | Comp. ex. |
| AH-1 | 87 | 35.7 | 54.1 | 4.2 | 5.6 | 0.4 | 21 | 977 | 2.3 | Good | Comp. ex. |
| AI-1 | 47 | 24.0 | 48.7 | 22.2 | 5.1 | 0.0 | 0 | 832 | 16.2 | Poor | Comp. ex. |
| AJ-1 | 43 | 39.3 | 48.6 | 6.7 | 5.4 | 0.0 | 511 | 974 | 2.5 | Good | Comp. ex. |
| AK-1 | 67 | 39.9 | 25.7 | 13.1 | 5.1 | 16.2 | 422 | 615 | 26.6 | Good | Comp. ex. |
| AL-1 | 71 | 3.1 | 56.5 | 15.9 | 24.5 | 0.0 | 40 | 1124 | 2.7 | Good | Comp. ex. |
| AM-1 | 46 | 4.8 | 70.7 | 18.8 | 5.7 | 0.0 | 17 | 1082 | 1.7 | Good | Comp. ex. |
| AN-1 | 33 | 39.4 | 43.5 | 6.8 | 2.1 | 8.2 | 18 | 680 | 20.6 | Good | Comp. ex. |
| AP-1 | 44 | 34.9 | 9.6 | 35.8 | 10.5 | 9.2 | 28 | 536 | 17.6 | Good | Comp. ex. |
| AQ-1 | 26 | 38.3 | 8.5 | 38.0 | 6.4 | 8.8 | 10 | 649 | 16.4 | Good | Comp. ex. |
| AR-1 | 66 | 8.1 | 58.3 | 27.6 | 6.0 | 0.0 | 118 | 891 | 2.8 | Good | Comp. ex. |
| AS-1 | 57 | 38.7 | 9.4 | 38.2 | 5.5 | 8.2 | 34 | 595 | 28.8 | Good | Comp. ex. |
| AT-1 | 17 | 38.3 | 8.6 | 38.3 | 8.1 | 6.7 | 28 | 556 | 25.4 | Good | Comp. ex. |
| AU-1 | 51 | 20.3 | 56.4 | 17.4 | 5.9 | 0.0 | 396 | 1014 | 2.8 | Good | Comp. ex. |
| AV-1 | 39 | 26.9 | 56.1 | 8.3 | 8.7 | 0.0 | 40 | 1089 | 2.7 | Good | Comp. ex. |
| AW-1 | 83 | 21.4 | 48.0 | 25.4 | 5.2 | 0.0 | 22 | 878 | 1.4 | Good | Comp. ex. |
| AX-1 | 43 | 11.3 | 56.8 | 25.7 | 6.2 | 0.0 | 8 | 949 | 0.6 | Good | Comp. ex. |
| AY-1 | 56 | 21.5 | 49.2 | 22.7 | 6.5 | 0.0 | 25 | 915 | 1.1 | Good | Comp. ex. |
| AZ-1 | 82 | 35.5 | 23.0 | 29.7 | 11.0 | 0.8 | 418 | 758 | 0.9 | Good | Comp. ex. |

TABLE 2-continued

| No. | Steel slab surface layer oxygen conc. (ppm) | Ferrite (%) | Total of martensite and tempered martensite (%) | Bainite (%) | Retained austenite (%) | Pearlite (%) | Number density (/500 µm²) | Tensile strength (MPa) | Breaking Elongation (%) | LME resistance | Remarks |
|---|---|---|---|---|---|---|---|---|---|---|---|
| BA-1 | 83 | 26.3 | 58.8 | 9.2 | 5.5 | 0.2 | 427 | 945 | 1.3 | Good | Comp. ex. |
| BB-1 | 82 | 16.4 | 58.4 | 17.1 | 6.1 | 2.0 | 261 | 851 | 1.6 | Good | Comp. ex. |
| BC-1 | 18 | 8.4 | 58.3 | 28.2 | 5.1 | 0.0 | 29 | 798 | 2.1 | Good | Comp. ex. |

*Bold underlines indicate outside scope of present invention.

Referring to Tables 2, Example Y-1 had a low C content, so the tensile strength was less than 700 MPa. Example Z-1 had a high C content, so the strength of the weld zone increased and as a result the LME resistance fell. Example AA-1 had a high Si content, so the retained austenite ended up excessively stabilizing and the LME resistance fell. Example AB-1 had a low Mn content, so B precipitates comprised of (Fe, Mn)₂B could not be formed and the LME resistance fell. Example AC-1 had a high Mn content, so the austenite phases in the steel sheet stabilized and those austenite phases ended up remaining after welding and the LME resistance fell. Example AD-1 had a high P content, so the steel sheet ended up becoming brittle and cracking occurred when the thermal stress increased at the time of welding. Example AE-1 had a high S content, so similarly the steel sheet ended up becoming brittle and cracking occurred when the thermal stress increased at the time of welding. Example AF-1 had a high N content, so boron nitrides (BN) were formed and formation of (Fe, Mn)₂B was obstructed and as a result the LME resistance fell. Example AG-1 had a high Al content, so the ferrite transformation in the steel sheet was promoted and sufficient tensile strength could not be obtained. Example AH-1 had a high Ti content, so bainite transformation in the steel sheet was suppressed and sufficient ductility could not be obtained. Example AI-1 had a low B content, so B precipitates comprised of (Fe, Mn)₂B could not be formed and the LME resistance fell.

Example AJ-1 had a high B content, so coarse B carbides were formed and the ductility fell. Example AK-1 had a high Co content, so pearlite transformation was promoted and sufficient tensile strength could not be obtained. Examples AL-1 and AM-1 respectively had high Ni and Mo contents, so ferrite transformation in the steel sheets was suppressed and the ductilities fell. Example AN-1 had a high Cr content, so pearlite transformation was promoted and the strength fell. Examples AP-1 and AQ-1 respectively had high Nb and V contents, so coarse carbides precipitated and the amounts of solute C decreased and as a result the martensite fractions fell and sufficient strengths could not be obtained. Example AR-1 had a high Cu content, so embrittlement of the steel sheet was invited and the ductility fell. Examples AS-1 and AT-1 respectively had high W and Ta contents, so coarse carbides precipitated and the amounts of solute C decreased and as a result the martensite fractions fell and sufficient strengths could not be obtained. Examples AU-1 to BC-1 respectively had high Sn, Sb, As, Mg, Ca, Y, Zr, La, and Ce contents, so embrittlement of the steel sheets was invited and the ductilities fell.

In contrast to this, in Examples A-1 to X-1, by suitably controlling the chemical compositions and structures of the steel sheets, it was possible to obtain steel sheets having improved LME resistances, high in strength, and excellent in ductility.

Examples 2

Furthermore, to investigate the effects of the producing conditions, the steel types A to X deemed to be excellent in properties in Table 2 were worked and heat treated under the producing conditions described in Table 3 to prepare sheet thickness 2.3 mm hot rolled steel sheets and evaluate the properties after cold rolling and annealing. Here, the abbreviations GI and GA of the plating treatments indicate methods of galvanization. GI indicates steel sheets dipped in a 460° C. hot dip galvanization bath to form galvanized layers on the surfaces of the steel sheets, while GA indicates steel sheets dipped in a hot dip galvanization bath, then raised in temperature to 485° C. to form alloy layers of iron and zinc on the surfaces of the steel sheets. Further, the steel sheets were held at their respective dwell temperatures in the annealing of the cold rolled sheets then cooled down to room temperature. In the process, the steel sheets were cooled once down to 150° C., then reheated and held there for 2 to 250 seconds to temper them. Examples in which the tempering times were 10800 and 33100 seconds are examples where after cooling down to room temperature, then coiling, the coils were tempered at a separate annealing apparatus (box annealing furnace). Further, in Table 3, examples where the tempering temperatures are described as "none" are examples which were not tempered. The obtained results are shown in Table 4. The methods of evaluation of the properties are similar to the case of Examples 1.

TABLE 3

| No. | Oxygen introduction method | Steel slab surface layer oxygen conc. (ppm) | Finish rolling completion temp. (° C.) | Coiling temp. (° C.) | Cold rolling rate (%) | Annealing of cold rolled sheet ||||
|---|---|---|---|---|---|---|---|---|---|
| | | | | | | Heating rate (° C./s) | Annealing temp. (° C.) | Hold time (s) | Average cooling rate (° C./s) |
| A-2 | Iron wire | 71 | 777 | 427 | 31.9 | 54.3 | 826 | 456 | 85.5 |
| B-2 | Iron wire | 58 | 944 | 516 | 69.6 | 50.0 | 783 | 259 | 40.3 |
| C-2 | None | 8 | 661 | 648 | 79.7 | 31.4 | 873 | 569 | 49.7 |
| D-2 | Iron wire | 32 | 863 | 679 | 52.3 | 75.4 | 817 | 223 | 9.3 |

TABLE 3-continued

| No. | | | | | | | | |
|---|---|---|---|---|---|---|---|---|
| E-2 | Iron wire | 30 | 757 | 501 | 36.8 | 72.2 | 785 | 404 | 58.9 |
| F-2 | Iron wire | 31 | 874 | 549 | 59.5 | 79.7 | 824 | 491 | 16.2 |
| G-2 | Iron wire | 43 | 878 | 656 | 55.1 | 32.0 | 862 | 502 | 54.4 |
| I-2 | Iron wire | 28 | 741 | 420 | 25.2 | 67.0 | 758 | 70 | 41.7 |
| J-2 | Iron wire | 32 | 700 | 529 | 56.8 | 87.9 | 845 | 322 | 29.4 |
| K-2 | Iron wire | 52 | 716 | 484 | 81.4 | 19.8 | 829 | 181 | 26.9 |
| M-2 | Iron wire | 38 | 809 | 447 | 35.7 | 27.4 | 819 | 275 | 69.2 |
| N-2 | Iron wire | 41 | 702 | 493 | 23.2 | 7.4 | 864 | 448 | 35.1 |
| O-2 | Iron wire | 13 | 729 | 581 | 46.5 | 92.3 | 858 | 55 | 95.0 |
| P-2 | Iron wire | 25 | 932 | 474 | 42.2 | 30.7 | 891 | 183 | 47.8 |
| Q-2 | Iron wire | 18 | 724 | 675 | 23.5 | 60.2 | 711 | 39 | 86.3 |
| R-2 | Iron wire | 60 | 844 | 620 | 62.1 | 71.6 | 817 | 444 | 65.1 |
| S-2 | Iron wire | 15 | 845 | 613 | 37.7 | 56.7 | 831 | 473 | 38.8 |
| T-2 | None | 6 | 798 | 613 | 21.1 | 37.2 | 852 | 214 | 16.9 |
| U-2 | Iron wire | 56 | 921 | 373 | 51.0 | 47.0 | 816 | 216 | 71.2 |
| V-2 | Iron wire | 72 | 900 | 560 | 14.9 | 54.0 | 822 | 335 | 17.3 |
| W-2 | Iron wire | 81 | 992 | 553 | 21.6 | 13.6 | 796 | 401 | 65.3 |
| X-2 | Iron wire | 62 | 753 | 433 | 33.3 | 16.5 | 843 | 356 | 74.2 |
| A-3 | Iron wire | 83 | 780 | 491 | 37.9 | 63.3 | 877 | 520 | 26.5 |
| B-3 | Iron wire | 81 | 871 | 459 | 18.1 | 59.9 | 840 | 154 | 70.3 |
| C-3 | Iron wire | 67 | 686 | 544 | 42.6 | 24.7 | 780 | 60 | 63.0 |
| D-3 | Iron wire | 80 | 750 | 565 | 56.5 | 12.0 | 818 | 297 | 49.6 |
| E-3 | None | 9 | 674 | 601 | 74.7 | 41.8 | 822 | 137 | 82.9 |
| F-3 | Iron wire | 89 | 764 | 728 | 70.8 | 54.4 | 836 | 335 | 39.4 |
| G-3 | Iron wire | 33 | 631 | 530 | 16.4 | 37.2 | 773 | 376 | 56.1 |
| H-3 | Iron wire | 41 | 899 | 500 | 62.7 | 68.1 | 830 | 443 | 79.4 |
| I-3 | Iron wire | 67 | 669 | 476 | 23.1 | 95.6 | 827 | 445 | 77.8 |
| J-3 | Iron wire | 27 | 926 | 688 | 27.4 | 48.5 | 827 | 388 | 19.3 |
| K-3 | Iron wire | 23 | 849 | 622 | 54.5 | 92.1 | 825 | 560 | 26.9 |
| L-3 | Iron wire | 80 | 802 | 651 | 34.4 | 96.4 | 778 | 47 | 34.7 |
| N-3 | Iron wire | 47 | 839 | 576 | 83.1 | 20.9 | 783 | 117 | 15.2 |
| O-3 | Iron wire | 73 | 812 | 599 | 76.2 | 75.8 | 767 | 177 | 88.2 |
| P-3 | Iron wire | 75 | 688 | 421 | 79.6 | 25.3 | 806 | 124 | 9.4 |
| Q-3 | Powder | 62 | 821 | 556 | 84.2 | 40.6 | 818 | 105 | 93.1 |
| R-3 | Iron wire | 82 | 784 | 675 | 16.1 | 38.2 | 847 | 178 | 24.0 |
| S-3 | Iron wire | 58 | 659 | 629 | 45.1 | 75.1 | 831 | 265 | 87.8 |
| T-3 | Iron wire | 45 | 826 | 590 | 47.0 | 6.9 | 876 | 297 | 53.9 |
| U-3 | Iron wire | 66 | 818 | 452 | 68.0 | 13.5 | 790 | 522 | 60.6 |
| V-3 | None | 5 | 701 | 620 | 59.5 | 78.2 | 826 | 407 | 80.3 |
| W-3 | Iron wire | 40 | 729 | 560 | 72.3 | 6.5 | 778 | 527 | 4.4 |

| | Annealing of cold rolled sheet | | | | Tempering of cold rolled sheet | | | |
|---|---|---|---|---|---|---|---|---|
| No. | Cooling stop temp. (° C.) | Dwell temp. (° C.) | Dwell time (s) | Plating | Tempering temp. (° C.) | Tempering time (s) | Skin pass rolling rate (%) | Remarks |
| A-2 | 194 | 531 | 221 | GA | 237 | 18 | 0.1 | Ex. |
| B-2 | 344 | 434 | 76 | None | 390 | 22 | 0.2 | Ex. |
| C-2 | 151 | 485 | 54 | None | 388 | 32 | 0.1 | Comp. ex. |
| D-2 | 264 | 440 | 548 | None | 300 | 8 | 0.5 | Ex. |
| E-2 | 215 | 396 | 315 | None | 340 | 30 | 0.3 | Ex. |
| F-2 | 317 | 396 | 395 | None | 265 | 29 | 0.2 | Ex. |
| G-2 | 439 | 515 | 22 | None | 371 | 10 | 0.3 | Ex. |
| I-2 | 326 | 502 | 503 | None | 322 | 21 | 0.2 | Ex. |
| J-2 | 383 | 462 | 252 | GA | 387 | 153 | 0.5 | Ex. |
| K-2 | 160 | 442 | 437 | None | 363 | 15 | 0.5 | Ex. |
| M-2 | 430 | 529 | 45 | None | 246 | 15 | 0.4 | Ex. |
| N-2 | 349 | 443 | 452 | None | 284 | 10800 | 0.6 | Ex. |
| O-2 | 61 | 406 | 330 | None | 298 | 18 | 0.4 | Ex. |
| P-2 | 246 | 513 | 394 | GI | 220 | 3 | 0.2 | Ex. |
| Q-2 | 90 | 494 | 405 | None | 351 | 13 | 0.5 | Ex. |
| R-2 | 146 | 382 | 62 | None | 319 | 14 | 0.6 | Ex. |
| S-2 | 116 | 396 | 327 | None | 366 | 18 | 0.4 | Ex. |
| T-2 | 272 | 456 | 554 | None | 213 | 15 | 0.4 | Comp. ex. |
| U-2 | 132 | 537 | 86 | None | 332 | 9 | 0.3 | Comp. ex. |
| V-2 | 215 | 361 | 236 | None | 332 | 31 | 0.4 | Ex. |
| W-2 | 347 | 378 | 373 | None | 170 | 26 | 0.5 | Comp. ex. |
| X-2 | 256 | 489 | 157 | None | 246 | 16 | 0.2 | Ex. |
| A-3 | 191 | 424 | 217 | None | 176 | 12 | 0.3 | Ex. |
| B-3 | 193 | 398 | 101 | GA | 251 | 5 | 0.4 | Ex. |
| C-3 | 221 | 353 | 135 | None | 166 | 18 | 0.4 | Ex. |

TABLE 3-continued

| | | | | | | | | |
|---|---|---|---|---|---|---|---|---|
| D-3 | 384 | 506 | 93 | GI | 222 | 8 | 0.2 | Ex. |
| E-3 | 118 | 366 | 153 | None | 301 | 28 | 0.2 | Comp. ex. |
| F-3 | 187 | 477 | 538 | None | 318 | 27 | 0.4 | Comp. ex. |
| G-3 | 74 | 467 | 192 | None | 376 | 17 | 0.5 | |
| H-3 | 298 | 530 | 457 | None | 257 | 19 | 0.2 | Ex. |
| I-3 | 238 | 508 | 317 | None | None | None | 0.2 | Ex. |
| J-3 | 95 | 411 | 474 | None | 268 | 11 | 0.6 | Ex. |
| K-3 | 178 | 460 | 468 | GI | 346 | 219 | 0.5 | Ex. |
| L-3 | 194 | 381 | 371 | None | 193 | 13 | 0.3 | Ex. |
| N-3 | 340 | 444 | 140 | None | 155 | 21 | 0.1 | Ex. |
| O-3 | 289 | 522 | 362 | GA | 192 | 9 | 0.5 | Ex. |
| P-3 | 351 | 406 | 208 | None | 177 | 29 | 0.3 | Ex. |
| Q-3 | 240 | 471 | 400 | None | 308 | 31 | 0.6 | Ex. |
| R-3 | 335 | 421 | 169 | GA | 279 | 33100 | 0.3 | Ex. |
| S-3 | 399 | 423 | 467 | None | None | None | 0.3 | Ex. |
| T-3 | 390 | 476 | 567 | None | 235 | 23 | 0.5 | Ex. |
| U-3 | 47 | 433 | 586 | None | 196 | 23 | 0.5 | Ex. |
| V-3 | 477 | 520 | 240 | None | 310 | 14 | 0.2 | Comp. ex. |
| W-3 | 155 | 392 | 272 | None | 176 | 20 | 0.4 | Ex. |

*Bold underlines indicate outside scope of present invention.

TABLE 4

| No. | Ferrite (%) | Total of martensite and tempered martensite (%) | Bainite (%) | Retained austenite (%) | Pearlite (%) | Number density (/500 μm²) | Tensile strength (MPa) | Breaking Elongation (%) | LME resistance | Sheet thickness (mm) | Remarks |
|---|---|---|---|---|---|---|---|---|---|---|---|
| A-2 | 32.6 | 53.0 | 7.2 | 7.2 | 0.0 | 56 | 999 | 12.9 | Good | 1.6 | Ex. |
| B-2 | 35.4 | 50.0 | 7.4 | 7.2 | 0.0 | 135 | 920 | 15 | Good | 0.7 | Ex. |
| C-2 | 37.8 | 23.3 | 18.0 | 12.0 | 8.9 | 0 | 716 | 24.4 | Poor | 0.5 | Comp. ex. |
| D-2 | 39.7 | 25.7 | 16.6 | 18.0 | 0.0 | 273 | 935 | 19.1 | Good | 1.1 | Ex. |
| E-2 | 28.7 | 26.0 | 28.4 | 16.9 | 0.0 | 71 | 978 | 17.6 | Good | 1.5 | Ex. |
| F-2 | 34.2 | 52.1 | 7.4 | 6.1 | 0.2 | 117 | 1020 | 12 | Good | 0.9 | Ex. |
| G-2 | 10.4 | 55.8 | 26.6 | 7.2 | 0.0 | 126 | 830 | 17 | Good | 1.0 | Ex. |
| I-2 | 33.2 | 32.9 | 23.8 | 10.1 | 0.0 | 67 | 717 | 22.8 | Good | 1.7 | Ex. |
| J-2 | 34.4 | 23.3 | 18.7 | 15.8 | 7.8 | 87 | 725 | 25.6 | Good | 1.0 | Ex. |
| K-2 | 37.5 | 35.3 | 12.3 | 14.5 | 0.4 | 129 | 911 | 18.2 | Good | 0.4 | Ex. |
| M-2 | 38.5 | 47.8 | 5.7 | 7.3 | 0.7 | 94 | 858 | 16.6 | Good | 1.5 | Ex. |
| N-2 | 6.3 | 46.8 | 37.6 | 9.3 | 0.0 | 51 | 921 | 15.8 | Good | 1.8 | Ex. |
| O-2 | 7.6 | 56.5 | 28.4 | 5.4 | 2.1 | 119 | 888 | 15.3 | Good | 1.2 | Ex. |
| P-2 | 5.1 | 59.8 | 26.2 | 5.1 | 3.8 | 251 | 853 | 16 | Good | 1.3 | Ex. |
| Q-2 | 34.9 | 24.5 | 26.1 | 14.5 | 0.0 | 55 | 847 | 20.5 | Good | 1.8 | Ex. |
| R-2 | 25.0 | 60.0 | 9.4 | 5.6 | 0.0 | 56 | 924 | 14.2 | Good | 0.9 | Ex. |
| S-2 | 27.8 | 51.7 | 9.1 | 11.4 | 0.0 | 81 | 889 | 17.7 | Good | 1.4 | Ex. |
| T-2 | 16.2 | 45.7 | 24.6 | 13.2 | 0.3 | 0 | 790 | 22 | Poor | 1.8 | Comp. ex. |
| U-2 | 24.7 | 60.7 | 6.3 | 8.3 | 0.0 | 100 | 905 | 2.6 | Good | 1.1 | Comp. ex. |
| V-2 | 28.5 | 56.3 | 5.3 | 9.9 | 0.0 | 103 | 1067 | 13.5 | Good | 2.0 | Ex. |
| W-2 | 45.2 | 6.1 | 31.5 | 10.7 | 6.5 | 202 | 698 | 23.1 | Good | 1.8 | Comp. ex. |
| X-2 | 22.2 | 57.2 | 8.6 | 11.7 | 0.3 | 116 | 786 | 20.9 | Good | 1.5 | Ex. |
| A-3 | 19.0 | 56.3 | 17.6 | 7.1 | 0.0 | 94 | 937 | 14.7 | Good | 1.4 | Ex. |
| B-3 | 23.6 | 54.2 | 12.5 | 9.7 | 0.0 | 102 | 912 | 16.5 | Good | 1.9 | Ex. |
| C-3 | 34.8 | 32.3 | 18.7 | 12.6 | 1.6 | 301 | 726 | 23.6 | Good | 1.3 | Ex. |
| D-3 | 38.2 | 19.5 | 20.8 | 21.5 | 0.0 | 237 | 816 | 25.1 | Good | 1.0 | Ex. |
| E-3 | 13.5 | 59.5 | 14.7 | 11.2 | 1.1 | 0 | 1018 | 14.2 | Poor | 0.6 | Comp. ex. |
| F-3 | 47.6 | 13.0 | 15.5 | 15.4 | 8.5 | 46 | 628 | 26.9 | Good | 0.7 | Comp. ex. |
| G-3 | — | — | — | — | — | — | — | — | — | — | — |
| H-3 | 25.2 | 51.8 | 14.4 | 8.1 | 0.5 | 48 | 765 | 19.3 | Good | 0.9 | Ex. |
| I-3 | 8.3 | 59.4 | 22.8 | 7.3 | 2.2 | 113 | 819 | 17.2 | Good | 1.8 | Ex. |
| J-3 | 37.0 | 24.7 | 17.4 | 12.2 | 8.7 | 45 | 776 | 21.6 | Good | 1.7 | Ex. |
| K-3 | 28.4 | 31.1 | 31.1 | 9.1 | 0.3 | 102 | 737 | 21.3 | Good | 1.0 | Ex. |
| L-3 | 14.1 | 52.4 | 19.1 | 14.4 | 0.0 | 130 | 967 | 16.4 | Good | 1.5 | Ex. |
| N-3 | 32.4 | 19.4 | 35.0 | 13.2 | 0.0 | 105 | 843 | 20.2 | Good | 0.4 | Ex. |
| O-3 | 35.7 | 33.5 | 21.8 | 8.9 | 0.0 | 54 | 866 | 17.3 | Good | 0.5 | Ex. |
| P-3 | 29.9 | 40.9 | 17.1 | 11.8 | 0.4 | 261 | 947 | 16.5 | Good | 0.5 | Ex. |
| Q-3 | 10.0 | 59.2 | 15.4 | 11.2 | 4.2 | 80 | 998 | 15.2 | Good | 0.4 | Ex. |
| R-3 | 34.8 | 52.0 | 7.4 | 5.4 | 0.4 | 48 | 925 | 14.5 | Good | 1.9 | Ex. |
| S-3 | 26.1 | 50.7 | 17.1 | 6.1 | 0.0 | 118 | 816 | 17.3 | Good | 1.3 | Ex. |
| T-3 | 6.2 | 59.2 | 23.3 | 11.3 | 0.0 | 87 | 818 | 19.7 | Good | 1.2 | Ex. |

TABLE 4-continued

| No. | Ferrite (%) | Total of martensite and tempered martensite (%) | Bainite (%) | Retained austenite (%) | Pearlite (%) | Number density (/500 μm²) | Tensile strength (MPa) | Breaking Elongation (%) | LME resistance | Sheet thickness (mm) | Remarks |
|---|---|---|---|---|---|---|---|---|---|---|---|
| U-3 | 34.4 | 48.0 | 9.4 | 8.2 | 0.0 | 119 | 904 | 15.9 | Good | 0.7 | Ex. |
| V-3 | 24.6 | 52.2 | 16.8 | 6.4 | 0.0 | 0 | 924 | 14.6 | Poor | 0.9 | Comp. ex. |
| W-3 | 34.5 | 53.2 | 7.1 | 5.2 | 0.0 | 207 | 1187 | 9.9 | Good | 0.6 | Ex. |

*Bold underlines indicate outside scope of present invention.

Referring to Table 4, Examples C-2, T-2, E-3, and V-3 had small amounts of oxygen introduced to the surface layers of the steel slabs at the time of the casting step, so (Fe, Mn)$_2$B precipitates could not be formed at the surface layer regions of the steel sheets and as a result the LME resistances fell. Example U-2 had a low coiling temperature, so the total content of martensite and tempered martensite became high, the steel sheet became hard and brittle, and as a result the ductility fell. Example W-2 had a high completion temperature of the finish rolling, so the ferrite content in the steel sheet was high and the total content of martensite and tempered martensite fell and as a result sufficient strength could not be obtained. Example F-3 had a high coiling temperature, so the ferrite content in the steel sheet became high and as a result sufficient strength could not be obtained. Example G-3 had a low completion temperature finish rolling, so cracks ended up forming at the steel sheet surface. Therefore, the structure was not analyzed and the mechanical properties were not evaluated.

In contrast to this, in all examples according to the present invention, by in particular introducing a predetermined amount of oxygen at the steel slab surface layer in the casting step and further suitably controlling the completion temperature and coiling temperature of the finish rolling, it was possible to obtain steel sheet having improved LME resistance which was high in strength and excellent in ductility.

REFERENCE SIGNS LIST 1a, 1b steel sheet
2a, 2b electrodes
3 nugget
4 heat affected zone
5 LME cracking
11 base metal steel sheet
12 plating layer
13 molten zinc
14 grain boundaries
15 B precipitates

The invention claimed is:

1. A steel sheet having a chemical composition comprising, by mass %,
C: 0.050 to 0.300%,
Si: 0.01 to 2.00%,
Mn: 0.10 to 4.00%,
P: 0.0001 to 0.0200%,
S: 0.0001 to 0.0200%,
N: 0.0001 to 0.0200%,
Al: 0.001 to 1.000%,
Ti: 0.001 to 0.500%,
B: 0.0007 to 0.0100%,
Co: 0 to 0.50%,
Ni: 0 to 1.00%,
Mo: 0 to 1.00%,
Cr: 0 to 2.000%,
Nb: 0 to 0.500%,
V: 0 to 0.500%,
Cu: 0 to 0.500%,
W: 0 to 0.100%,
Ta: 0 to 0.100%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
a balance of Fe and impurities, wherein
the steel sheet comprises, by area ratio,
ferrite: 5.0 to 40.0%,
total of martensite and tempered martensite: 10.0 to 60.0%,
bainite: 5.0 to 40.0%, and
retained austenite: 5.0 to 25.0%,
the remaining structures comprise 10.0% or less of pearlite,
in a surface layer region down to a depth of 100 μm from the surface in the sheet thickness direction, (Fe, Mn)$_2$B precipitates having a circle equivalent diameter of 50 to 300 nm are present in a number density of 1/500 μm² or more.

2. The steel sheet according to claim 1, comprising one or more of
Co: 0.01 to 0.50%,
Ni: 0.01 to 1.00%,
Mo: 0.01 to 1.00%,
Cr: 0.001 to 2.000%,
Nb: 0.001 to 0.500%,
V: 0.001 to 0.500%,
Cu: 0.001 to 0.500%,
W: 0.001 to 0.100%,
Ta: 0.001 to 0.100%,
Sn: 0.001 to 0.050%,
Sb: 0.001 to 0.050%,
As: 0.001 to 0.050%,
Mg: 0.0001 to 0.0500%,
Ca: 0.001 to 0.050%,
Y: 0.001 to 0.050%,
Zr: 0.001 to 0.050%,
La: 0.001 to 0.050%, and
Ce: 0.001 to 0.050%.

3. The steel sheet according to claim 1, wherein the steel sheet has a tensile strength of 700 MPa or more and a breaking elongation of 3.0% or more.

4. The steel sheet according to claim 1, wherein the (Fe, Mn)$_2$B precipitates having a circle equivalent diameter of 50 to 300 nm are present in a number density of 1 to 500/500 µm$^2$.

5. The steel sheet according to claim 1, wherein at least one surface of the steel sheet has a plating layer containing zinc.

6. A method for producing a steel sheet, comprising:
continuously casting a molten steel having the chemical composition according to claim 1 to form a steel slab, wherein the continuously casting includes introducing more than 10 ppm and less than 100 ppm of oxygen into the surface layer of the steel slab,
hot rolling including finish rolling the steel slab, wherein a completion temperature of the finish rolling is 650 to 950° C.,
coiling the obtained hot rolled steel sheet at a coiling temperature of 400 to 700° C., and
cold rolling the hot rolled steel sheet, then annealing it.

7. The method for producing steel sheet according to claim 6, wherein in the annealing after the cold rolling, a plating layer containing zinc is formed on at least one surface of the steel sheet.

* * * * *